(12) United States Patent
Ogino

(10) Patent No.: US 7,061,651 B2
(45) Date of Patent: Jun. 13, 2006

(54) IMAGE PROCESSING METHOD AND APPARATUS, RECORDING MEDIUM, AND IMAGING APPARATUS

(75) Inventor: Tetsuo Ogino, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 884 days.

(21) Appl. No.: 09/863,998

(22) Filed: May 23, 2001

(65) Prior Publication Data

US 2002/0026947 A1 Mar. 7, 2002

(30) Foreign Application Priority Data

Jul. 21, 2000 (JP) ............................ 2000-220416

(51) Int. Cl.
*H04N 1/40* (2006.01)
(52) U.S. Cl. ...................................... 358/3.27; 358/2.1
(58) Field of Classification Search ................. 358/1.9, 358/2.1, 3.15, 3.27; 382/199–201, 265–270
See application file for complete search history.

(56) References Cited

U.S. PATENT DOCUMENTS 5,671,264 A 9/1997 Florent
5,771,318 A 6/1998 Fang

OTHER PUBLICATIONS

Scher et al "Some New Image Smoothing techniques" IEEE Transactions on Systems Man and Cybernetics, vol. 10,No. 1, Jan. 1980 pp. 153-158.
Schulze et al "A morphology-based filter structure for edge enhancing smoothign" Proceedings of Int. Conf. on Image Processing, Austin, No. 13-16,1994; IEEE Com. So. Press, US, vol. 3, Conf. 1, Nov. 13, 1994 pp. 530-534.
Lee ,"Digital image enhancement and hoise filtering by use of local statistics" IEEE Transactions on Pattern Analysis and Machine Intelligence,IEEE Inc. PAMI 2, No. 2, Mar. 1980, pp. 165-168.

*Primary Examiner*—Thomas D. Lee
*Assistant Examiner*—Stephen Brinich
(74) *Attorney, Agent, or Firm*—Moonray Kojima

(57) ABSTRACT

For the purpose of providing an image processing method for properly performing filtering, a local region is defined containing a pixel of interest in an original image (504); pixel groups are defined in the region in a plurality of modes (506); a pixel group mode which best fits a structure of the original image in the local region is selected (508, 510); and an average pixel value of the pixel group which contains the pixel of interest is used as a new pixel value for the pixel of interest.

60 Claims, 15 Drawing Sheets

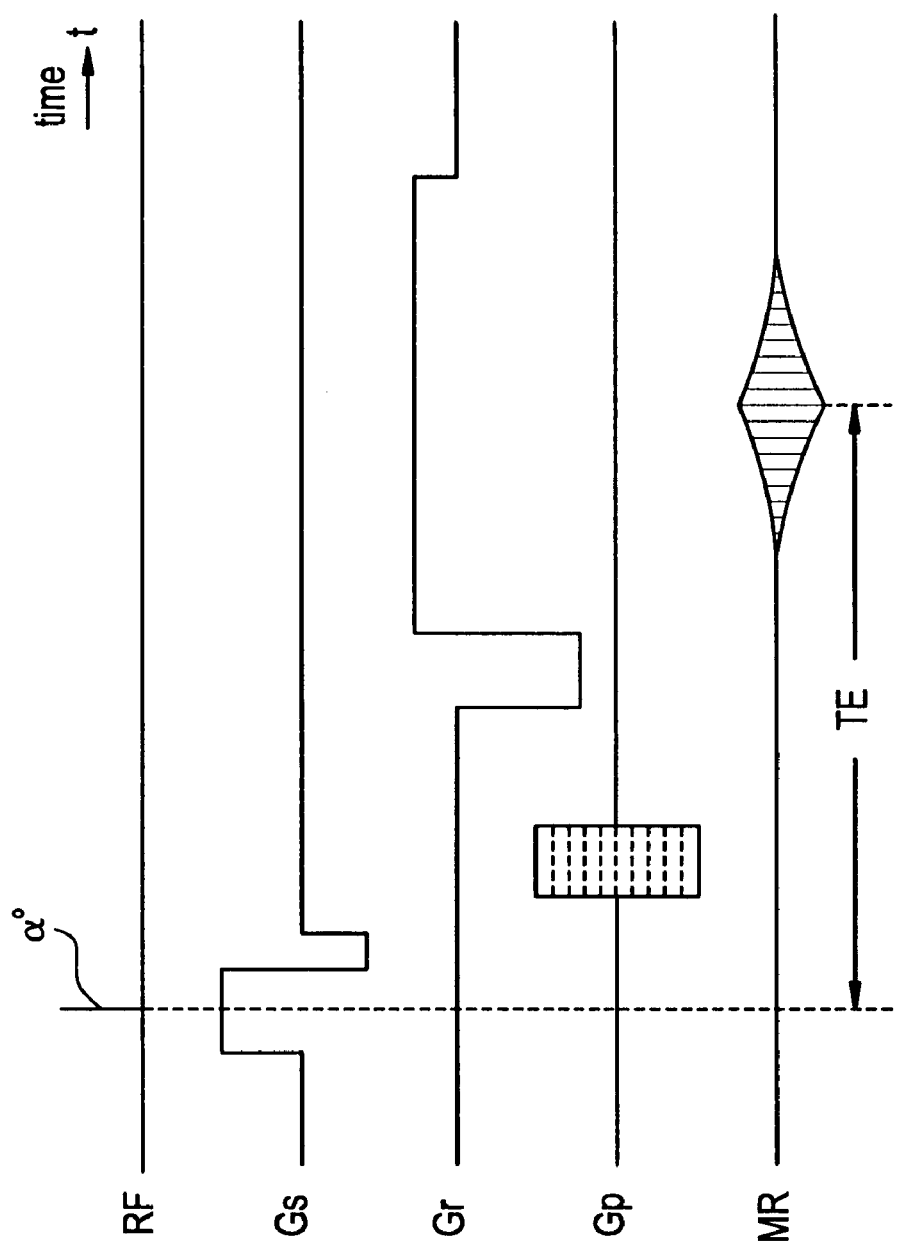

k Pixel of intrest

IMAGE PROCESSING METHOD AND APPARATUS, RECORDING MEDIUM, AND IMAGING APPARATUS

BACKGROUND OF THE INVENTION

The present invention relates to an image processing method and apparatus, a recording medium and an imaging apparatus, and more particularly to an image processing method and apparatus for removing noise of an image, a medium for recording a program for a computer to perform such an image processing function, and an imaging apparatus comprising such an image processing apparatus.

In an MRI (magnetic resonance imaging) apparatus, an object to be imaged is carried into an internal space of a magnet system, i.e., a space in which a static magnetic field is generated; a gradient magnetic field and a high frequency magnetic field are applied to generate a magnetic resonance signal inside the object; and a tomographic image is produced (reconstructed) based on the received signal.

In order for an observer to view a fine structure in the tomographic image in more detail, filtering is performed to remove noise in the image. Although the filtering is based on low-pass filtering, since the sharpness of the image is lowered by using the low-pass filtering alone, filtering with an additional process for preserving the sharpness is employed.

The filtering with the additional process for preserving the sharpness, however, has a side effect that an incidental texture created by noise is enhanced, causing an anatomically meaningless structure (false structure) to be generated.

SUMMARY OF THE INVENTION

Therefore, an object of the present invention is to provide an image processing method and apparatus for properly performing filtering, a medium for recording a program for a computer to perform such an image processing function, and an imaging apparatus comprising such an image processing apparatus.

(1) The present invention, in accordance with one aspect thereof for solving the aforementioned problem, is an image processing method characterized in that the method comprises the steps of: defining a local region containing a pixel of interest in an original image; defining in a plurality of modes a pixel group consisting of a plurality of pixels containing said pixel of interest and a pixel group(s) consisting of a plurality of pixels not overlapping those in the former pixel group, in said region; selecting a pixel group mode from said defined plurality of pixel group modes which best fits a structure of said original image in said region; and producing an image using an average pixel value of said pixel group containing the pixel of interest in said selected pixel group mode, as a new pixel value for said pixel of interest.

According to the invention in this aspect, since a pixel group mode is selected which best fits a structure in the original image, and in that pixel group mode, the average pixel value of the pixel group containing the pixel of interest is used as a new pixel value for the pixel of interest, filtering less liable to generate a false structure can be performed.

(2) The present invention, in accordance with another aspect thereof for solving the aforementioned problem, is an image processing method characterized in that the method comprises the steps of: defining a local region containing a pixel of interest in an original image; defining in a plurality of modes a pixel group consisting of a plurality of pixels containing said pixel of interest and a pixel group(s) consisting of a plurality of pixels not overlapping those in the former pixel group, in said region; selecting a pixel group mode from said defined plurality of pixel group modes which best fits a structure of said original image in said region; calculating an average pixel value of said pixel group containing the pixel of interest in said selected pixel group mode; calculating an average pixel value of said region; and producing an image using a pixel value obtained from a weighted addition of said average pixel value of the pixel group and said average pixel value of the region, as a new pixel value for said pixel of interest.

According to the invention in this aspect, since a new pixel value for the pixel of interest is obtained from a weighted addition of the average pixel value of a pixel group calculated in a manner similar to (1) and the average pixel value of a region, filtering yet less liable to generate a false structure can be performed.

(3) The present invention, in accordance with still another aspect thereof for solving the aforementioned problem, is an image processing method characterized in that the method comprises the steps of: defining a local region containing a pixel of interest in an original image; defining in a plurality of modes a pixel group consisting of a plurality of pixels containing said pixel of interest and a pixel group(s) consisting of a plurality of pixels not overlapping those in the former pixel group, in said region; selecting a pixel group mode from said defined plurality of pixel group modes which best fits a structure of said original image in said region; calculating an average pixel value of said pixel group containing the pixel of interest in said selected pixel group mode; calculating an average pixel value of said region; performing a weighted addition on said average pixel value of the pixel group and said average pixel value of the region; and producing an image using a pixel value obtained from a weighted addition of the pixel value obtained from said former weighted addition and a pixel value of said pixel of interest, as a new pixel value for said pixel of interest.

According to the invention in this aspect, since a new pixel value for the pixel of interest is obtained from a weighted addition of the pixel value calculated in a maimer similar to (2) and the pixel value of the pixel of interest in the original image, filtering can be performed without corrupting a characteristic structure in the original image.

(4) The present invention, in accordance with still another aspect thereof for solving the aforementioned problem, is an image processing method characterized in that the method comprises the steps of: defining a local region containing a pixel of interest in an original image; defining in a plurality of modes a pixel group consisting of a plurality of pixels containing said pixel of interest and a pixel group(s) consisting of a plurality of pixels not overlapping those in the former pixel group in said region; selecting a pixel group mode from said defined plurality of pixel group modes which best fits a structure of said original image in said region; calculating an average pixel value of said pixel group containing the pixel of interest in said selected pixel group mode; calculating an average pixel value of said region; performing a weighted addition on said average pixel value of the pixel group and said average pixel value of the region; producing an image using a pixel value obtained from a weighted addition of the pixel value obtained from said former weighted addition and a pixel value of said pixel of interest, as a new pixel value for said pixel of interest; and performing a weighted addition on said produced image and said original image.

According to the invention in this aspect, since a weighted addition is performed on an image produced by the pixel value calculated in a manner similar to (3) and the original image, the effect of filtering can be mitigated.

(5) The present invention, in accordance with still another aspect thereof for solving the aforementioned problem, is the image processing method as described regarding (4), characterized in that a weighting factor for said weighted addition of said produced image and said original image is adjustable.

According to the invention in this aspect, the effect of filtering can be adjusted by adjusting a weighting factor.

(6) The present invention, in accordance with still another aspect thereof for solving the aforementioned problem, is the image processing method as described regarding any one of (2)–(5), characterized in that a weighting factor for said weighted addition of said average pixel value of the pixel group and said average pixel value of the region is a function of a minimum value and a maximum value of a total sum of respective residual sums of squares of pixel values of said pixel groups, said total sum being calculated for each of said pixel group modes.

According to the invention in this aspect, in the image processing as described regarding any one of (2)–(5), since a weighting factor for the weighted addition of the average pixel value of a pixel group and the average pixel value of a region is a function of a minimum value and a maximum value of a total sum of respective residual sums of squares of pixel values of the pixel groups, the total sum being calculated for each of the pixel group modes, filtering less liable to generate a false structure can be performed.

(7) The present invention, in accordance with still another aspect thereof for solving the aforementioned problem, is the image processing method as described regarding (6), characterized in that said function is a function which makes a weight for said average pixel value of the region maximum when the minimum value and the maximum value of said total sum of residual Sums of squares are equal, and reduces the weight for said average pixel value of the region as the minimum value of said total sum of residual sums of squares becomes smaller with respect to the maximum value.

According to the invention in this aspect, in the image processing as described regarding (6), since the function is a function which makes a weight for the average pixel value of a region maximum when the minimum value and the maximum value of the total sum of residual sums of squares are equal, and reduces the weight for the average pixel value of a region as the minimum value of the total sum of residual sums of squares becomes smaller with respect to the maximum value, filtering less liable to generate a false structure can be performed.

(8) The present invention, in accordance with still another aspect thereof for solving the aforementioned problem, is the image processing method as described regarding any one of (3)–(7), characterized in that a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said pixel group modes, and the variance of noise of said original image.

According to the invention in this aspect, in the image processing as described regarding any one of (3)–(7), since a weighting factor for the weighted addition of the pixel value obtained from the former weighted addition and the pixel value of the pixel of interest in the original image is a function of the minimum value of the total sum of residual sums of squares of pixel values of the pixel groups, the total sum being calculated for each of pixel group modes, and the variance of noise of the original image, filtering can be performed without corrupting a characteristic structure in the original image.

(9) The present invention, in accordance with still another aspect thereof for solving the aforementioned problem, is the image processing method as described regarding (8), characterized in that said function is a function which makes a weight for the pixel value obtained from said former weighted addition maximum when the minimum value of said total sum of residual sums of squares divided by the number of pixels in said pixel group mode is equal to said variance of noise, and reduces the weight for the pixel value obtained from said former weighted addition as the difference between the minimum value of said total sum of residual sums of squares divided by the number of pixels in said pixel group mode and said variance of noise becomes larger.

According to the invention in this aspect, in the image processing as described regarding (8), since the function is a function which makes a weight for the pixel value obtained from the former weighted addition maximum when the minimum value of the total sum of residual sums of squares divided by the number of pixels in the pixel group mode is equal to the variance of noise, and reduces the weight for the pixel value obtained from the former weighted addition as the difference between the minimum value of the total sum of residual sums of squares divided by the number of pixels in the pixel group mode and the variance of noise becomes larger, filtering can be performed without corrupting a characteristic structure in the original image.

(10) The present invention, in accordance with still another aspect thereof for solving the aforementioned problem, is the image processing method as described regarding any one of (1)–(9), characterized in that said step of selecting a pixel group mode is performed by selecting a pixel group mode in which said total sum of residual sums of squares of pixel values of the pixel groups is minimum.

According to the invention in this aspect, in the image processing as described regarding any one of (1)–(9), since the selecting of a pixel group mode is performed by selecting a pixel group mode in which the total sum of residual sums of squares of pixel values of the pixel groups is minimum, a pixel group mode can be selected which best fits a structure in the original image.

(11) The present invention, in accordance with still another aspect thereof for solving the aforementioned problem, is the image processing method as described regarding any one of (1)–(9), characterized in that said step of selecting a pixel group mode is performed by selecting a pixel group mode in which said total sum of residual sums of squares of pixel values of the pixel groups is closest to the variance of noise of said original image multiplied by the number of pixels in the pixel group mode.

According to the invention in this aspect, in the image processing as described regarding any one of (1)–(9), since the selecting of a pixel group mode is performed by selecting a pixel group mode in which the total sum of residual sums of squares of pixel values of the pixel groups is closest to the variance of noise of the original image multiplied by the number of pixels in the pixel group mode, a pixel group mode can be selected which best fits a structure in the original image.

(12) The present invention, in accordance with still another aspect thereof for solving the aforementioned problem, is an image processing method characterized in that the method comprises the steps of: defining in a plurality of modes a local region containing a pixel of interest in an original image; defining in a plurality of modes a pixel group consisting of a plurality of pixels containing said pixel of interest and a pixel group(s) consisting of a plurality of pixels not overlapping those in the former pixel group, in each of said defined plurality of modes of region; selecting a pixel group mode from said defined plurality of pixel group modes which best fits a structure of said original image in said region throughout said defined plurality of modes of region; and producing an image using an average pixel value of said pixel group containing the pixel of interest in said selected pixel group mode, as a new pixel value for said pixel of interest.

According to the invention in this aspect, since a pixel group mode is selected which best fits a structure of the original image in a region throughout a plurality of modes of region, and in that pixel group mode, the average pixel value of the pixel group containing the pixel of interest is used as a new pixel value for the pixel of interest, filtering less liable to generate a false structure can be performed.

(13) The present invention, in accordance with still another aspect thereof for solving the aforementioned problem, is an image processing method characterized in that the method comprises the steps of: defining in a plurality of modes a local region containing a pixel of interest in an original image; defining in a plurality of modes a pixel group consisting of a plurality of pixels containing said pixel of interest and a pixel group(s) consisting of a plurality of pixels not overlapping those in the former pixel group, in each of said defined plurality of modes of region; selecting a pixel group mode from said defined plurality of pixel group modes which best fits a structure of said original image in said region throughout said defined plurality of modes of region; calculating an average pixel value of said pixel group containing the pixel of interest in said selected pixel group mode; calculating an average pixel value of said region in one of said plurality of modes of region in which said selected pixel group mode is defined; and producing an image using a pixel value obtained from a weighted addition of said average pixel value of the pixel group and said average pixel value of the region, as a new pixel value for said pixel of interest.

According to the invention in this aspect, since a new pixel value for the pixel of interest is obtained from a weighted addition of the average pixel value of a pixel group calculated in a manner similar to (12) and the average pixel value of a region, filtering yet less liable to generate a false structure can be performed.

(14) The present invention, in accordance with still another aspect thereof for solving the aforementioned problem, is an image processing method characterized in that the method comprises the steps of: defining in a plurality of modes a local region containing a pixel of interest in an original image; defining in a plurality of modes a pixel group consisting of a plurality of pixels containing said pixel of interest and a pixel group(s) consisting of a plurality of pixels not overlapping those in the former pixel group, in each of said defined plurality of modes of region; selecting a pixel group mode from said defined plurality of pixel group modes which best fits a structure of said original image in said region throughout said defined plurality of modes of region; calculating an average pixel value of said pixel group containing the pixel of interest in said selected pixel group mode, calculating an average pixel value of said region in one of said plurality of modes of region in which said selected pixel group mode is defined; performing a weighted addition on said average pixel value of the pixel group and said average pixel value of the region; and producing an image using a pixel value obtained from a weighted addition of the pixel value obtained from said former weighted addition and a pixel value of said pixel of interest, as a new pixel value for said pixel of interest.

According to the invention in this aspect, since a new pixel value for the pixel of interest is obtained from a weighted addition of the pixel value calculated in a manner similar to (19) and the pixel value of the pixel of interest in the original image, filtering can be performed without corrupting a characteristic structure in the original image.

(15) The present invention, in accordance with still another aspect thereof for solving the aforementioned problem, is an image processing method characterized in that the method comprises the steps of: defining in a plurality of modes a local region containing a pixel of interest in an original image; defining in a plurality of modes a pixel group consisting of a plurality of pixels containing said pixel of interest and a pixel group(s) consisting of a plurality of pixels not overlapping those in the former pixel group, in each of said defined plurality of modes of region; selecting a pixel group mode from said defined plurality of pixel group modes which best fits a structure of said original image in said region throughout said defined plurality of modes of region; calculating an average pixel value of said pixel group containing the pixel of interest in said selected pixel group mode, calculating an average pixel value of said region in one of said plurality of modes of region in which said selected pixel group mode is defined; performing a weighted addition on said average pixel value of the pixel group and said average pixel value of the region; producing an image using a pixel value obtained from a weighted addition of the pixel value obtained from said former weighted addition and a pixel value of said pixel of interest, as a new pixel value for said pixel of interest; and performing a weighted addition on said produced image and said original image.

According to the invention in this aspect, since a weighted addition is performed on an image produced by the pixel value calculated in a manner similar to (14) and the original image, the effect of filtering can be mitigated.

(16) The present invention, in accordance with still another aspect thereof for solving the aforementioned problem, is the image processing method as described regarding (15), characterized in that a weighting factor for said weighted addition of said produced image and said original image is adjustable.

According to the invention in this aspect, the effect of filtering can be adjusted by adjusting a weighting factor.

(17) The present invention, in accordance with still another aspect thereof for solving the aforementioned problem, is the image processing method as described regarding any one of (13)–(16), characterized in that a weighting factor for said weighted addition of said average pixel value of the pixel group and said average pixel value of the region is a function of a minimum value and a maximum value of a total sum of respective residual sums of squares of pixel values of said pixel groups, said total sum being calculated for each of said image group modes throughout said defined plurality of modes of region.

According to the invention in this aspect, in the image processing as described regarding any one of (13)–(16), since a weighting factor for the weighted addition of the average pixel value of a pixel group and the average pixel value of a region is a function of a minimum value and a maximum value of a total sum of respective residual sums of squares of pixel values of the pixel groups, the total sum being calculated for each of the pixel group modes throughout a plurality of modes of region, filtering less liable to generate a false structure can be performed.

(18) The present invention, in accordance with still another aspect thereof for solving the aforementioned problem, is the image processing method as described regarding (17), characterized in that said function is a function which makes a weight for said average pixel value of the region maximum when the minimum value and the maximum value of said total sum of residual sums of squares are equal, and reduces the weight for said average pixel value of the region as the minimum value of said total sum of residual sums of squares becomes smaller with respect to the maximum value.

According to the invention in this aspect, in the image processing as described regarding (17), since the function is a function which makes a weight for the average pixel value of a region maximum when the minimum value and the maximum value of the total sum of residual sums of squares are equal, and reduces the weight for the average pixel value of a region as the minimum value of the total sum of residual sums of squares becomes smaller with respect to the maximum value, filtering less liable to generate a false structure can be performed.

(19) The present invention, in accordance with still another aspect thereof for solving the aforementioned problem, is the image processing method as described regarding any one of (14)–(18), characterized in that a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said image group modes throughout said defined plurality of modes of region, and the variance of noise of said original image.

According to the invention in this aspect, in the image processing as described regarding in any one of (14)–(18), since a weighting factor for the weighted addition of the pixel value obtained from the former weighted addition and the pixel value of the pixel of interest in the original image is a function of the minimum value of the total sum of residual sums of squares of pixel values of the pixel groups, the total sum being calculated for each of pixel group modes throughout a plurality of modes of region, and the variance of noise of the original image, filtering can be performed without corrupting a characteristic structure in the original image.

(20) The present invention, in accordance with still another aspect thereof for solving the aforementioned problem, is the image processing method as described regarding (19), characterized in that said function is a function which makes a weight for the pixel value obtained from said former weighted addition maximum when the minimum value of said total sum of residual sums of squares divided by the number of pixels in said pixel group mode is equal to said variance of noise, and reduces the weight for the pixel value obtained from said former weighted addition as the difference between the minimum value of said total sum of residual sums of squares divided by the number of pixels in said pixel group mode and said variance of noise becomes larger.

According to the invention in this aspect, in the image processing as described regarding (19), since the function is a function which makes a weight for the pixel value obtained from the former weighted addition maximum when the minimum value of the total sum of residual sums of squares divided by the number of pixels in the pixel group mode is equal to the variance of noise, and reduces the weight for the pixel value obtained from the former weighted addition as the difference between the minimum value of the total sum of residual sums of squares divided by the number of pixels in the pixel group mode and the variance of noise becomes larger, filtering can be performed without corrupting a characteristic structure in the original image.

(21) The present invention, in accordance with still another aspect thereof for solving the aforementioned problem, is the image processing method as described regarding any one of (12)–(20), characterized in that said step of selecting a pixel group mode is performed by selecting an image group mode in which said total sum of residual sums of squares of pixel values of the pixel groups is minimum throughout said defined plurality of modes of region.

According to the invention in this aspect, in the image processing as described regarding any one of (12)–(20), since the selecting of a pixel group mode is performed by selecting a pixel group mode in which the total sum of residual sums of squares of pixel values of the pixel groups is minimum throughout a plurality of modes of region, a pixel group mode can be selected which best fits a structure in the original image.

(22) The present invention, in accordance with still another aspect thereof for solving the aforementioned problem, is the image processing method as described regarding any one of (12)–(20), characterized in that said step of selecting a pixel group mode is performed by selecting a pixel group mode in which said total sum of residual sums of squares of pixel values of the pixel groups is closest to the variance of noise of said original image multiplied by the number of pixels in the pixel group mode.

According to the invention in this aspect, in the image processing as described regarding any one of (12)–(20), since the selecting of a pixel group mode is performed by selecting a pixel group mode in which the total sum of residual sums of squares of pixel values of the pixel groups is closest to the variance of noise of the original image multiplied by the number of pixels in the pixel group mode, a pixel group mode can be selected which best fits a structure in the original image.

(23) The present invention, in accordance with still another aspect thereof for solving the aforementioned problem, is an image processing apparatus characterized in that the apparatus comprises: region defining means for defining a local region containing a pixel of interest in an original image; pixel group defining means for defining in a plurality of modes a pixel group consisting of a plurality of pixels containing said pixel of interest and a pixel group(s) consisting of a plurality of pixels not overlapping those in the former pixel group, in said region; selecting means for selecting a pixel group mode from said defined plurality of pixel group modes which best fits a structure of said original image in said region; and image producing means for producing an image using an average pixel value of said pixel group containing the pixel of interest in said selected pixel group mode, as a new pixel value for said pixel of interest.

According to the invention in this aspect, since a pixel group mode is selected which best fits a structure in the original image, and in that pixel group mode, the average pixel value of the pixel group containing the pixel of interest is used as a new pixel value for the pixel of interest, filtering less liable to generate a false structure can be performed.

(24) The present invention, in accordance with still another aspect thereof for solving the aforementioned problem, is an image processing apparatus characterized in that the apparatus comprises: region defining means for defining a local region containing a pixel of interest in an original image; pixel group defining means for defining in a plurality of modes a pixel group consisting of a plurality of pixels containing said pixel of interest and a pixel group(s) consisting of a plurality of pixels not overlapping those in the former pixel group, in said region; selecting means for selecting a pixel group mode from said defined plurality of pixel group modes which best fits a structure of said original image in said region; first pixel value calculating means for calculating an average pixel value of said pixel group containing the pixel of interest in said selected pixel group mode; second pixel value calculating means for calculating an average pixel value of said region; and image producing means for producing an image using a pixel value obtained from a weighted addition of said average pixel value of the pixel group and said average pixel value of the region, as a new pixel value for said pixel of interest.

According to the invention in this aspect, since a new pixel value for the pixel of interest is obtained from a weighted addition of the average pixel value of a pixel group calculated in a manner similar to (23) and the average pixel value of a region, filtering yet less liable to generate a false structure can be performed.

(25) The present invention, in accordance with still another aspect thereof for solving the aforementioned problem, is an image processing apparatus characterized in that the apparatus comprises: region defining means for defining a local region containing a pixel of interest in an original image; pixel group defining means for defining in a plurality of modes a pixel group consisting of a plurality of pixels containing said pixel of interest and a pixel group(s) consisting of a plurality of pixels not overlapping those in the former pixel group, in said region; selecting means for selecting a pixel group mode from said defined plurality of pixel group modes which best fits a structure of said original image in said region; first pixel value calculating means for calculating an average pixel value of said pixel group containing the pixel of interest in said selected pixel group mode; second pixel value calculating means for calculating an average pixel value of said region; addition means for performing a weighted addition on said average pixel value of the pixel group and said average pixel value of the region; and image producing means for producing an image using a pixel value obtained from a weighted addition of the pixel value obtained from said former weighted addition and a pixel value of said pixel of interest, as a new pixel value for said pixel of interest.

According to the invention in this aspect, since a new pixel value for the pixel of interest is obtained from a weighted addition of the pixel value calculated in a manner similar to (24) and the pixel value of the pixel of interest in the original image, filtering can be performed without corrupting a characteristic structure in the original image.

(26) The present invention, in accordance with still another aspect thereof for solving the aforementioned problem, is an image processing apparatus characterized in that the apparatus comprises: region defining means for defining a local region containing a pixel of interest in an original image; pixel group defining means for defining in a plurality of modes a pixel group consisting of a plurality of pixels containing said pixel of interest and a pixel group(s) consisting of a plurality of pixels not overlapping those in the former pixel group, in said region; selecting means for selecting a pixel group mode from said defined plurality of pixel group modes which best fits a structure of said original image in said region; first pixel value calculating means for calculating an average pixel value of said pixel group containing the pixel of interest in said selected pixel group mode; second pixel value calculating means for calculating an average pixel value of said region; first addition means for performing a weighted addition on said average pixel value of the pixel group and said average pixel value of the region; image producing means for producing an image using a pixel value obtained from a weighted addition of the pixel value obtained from said former weighted addition and a pixel value of said pixel of interest, as a new pixel value for said pixel of interest; and second addition means for performing a weighted addition on said produced image and said original image.

According to the invention in this aspect, since a weighted addition is performed on an image produced by the pixel value calculated in a manner similar to (25) and the original image, the effect of filtering can be mitigated.

(27) The present invention, in accordance with still another aspect thereof for solving the aforementioned problem, is the image processing apparatus as described regarding (26), characterized in that a weighting factor for said weighted addition of said produced image and said original image is adjustable.

According to the invention in this aspect, the effect of filtering can be adjusted by adjusting a weighting factor.

(28) The present invention, in accordance with still another aspect thereof for solving the aforementioned problem, is the image processing apparatus as described regarding any one of (24)–(27), characterized in that a weighting factor for said weighted addition of said average pixel value of the pixel group and said average pixel value of the region is a function of a minimum value and a maximum value of a total sum of respective residual sums of squares of pixel values of said pixel groups, said total sum being calculated for each of said pixel group modes.

According to the invention in this aspect, in the image processing as described regarding (24)–(27), since a weighting factor for the weighted addition of the average pixel value of a pixel group and the average pixel value of a region is a function of a minimum value and a maximum value of a total sum of respective residual sums of squares of pixel values of the pixel groups, the total sum being calculated for each of the pixel group modes, filtering less liable to generate a false structure can be performed.

(29) The present invention, in accordance with still another aspect thereof for solving the aforementioned problem, is the image processing apparatus as described regarding (28), characterized in that said function is a function which makes a weight for said average pixel value of the region maximum when the minimum value and the maximum value of said total sum of residual sums of squares are equal, and reduces the weight for said average pixel value of the region as the minimum value of said total sum of residual sums of squares becomes smaller with respect to the maximum value.

According to the invention in this aspect, in the image processing as described regarding (28), since the function is a function which makes a weight for the average pixel value of a region maximum when the minimum value and the maximum value of the total sum of residual sums of squares are equal, and reduces the weight for the average pixel value of a region as the minimum value of the total sum of residual sums of squares becomes smaller with respect to the maximum value, filtering less liable to generate a false structure can be performed.

(30) The present invention, in accordance with still another aspect thereof for solving the aforementioned problem, is the image processing apparatus as described regarding any one of (25)–(29), characterized in that a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said pixel group modes, and the variance of noise of said original image.

According to the invention in this aspect, in the image processing as described regarding (25)–(29), since a weighting factor for the weighted addition of the pixel value obtained from the former weighted addition and the pixel value of the pixel of interest in the original image is a function of the minimum value of the total sum of residual sums of squares of pixel values of the pixel groups, the total sum being calculated for each of pixel group modes, and the variance of noise of the original image, filtering can be performed without corrupting a characteristic structure in the original image.

(31) The present invention, in accordance with still another aspect thereof for solving the aforementioned problem, is the image processing apparatus as described regarding (30) characterized in that said function is a function which makes a weight for the pixel value obtained from said former weighted addition maximum when the minimum value of said total sum of residual sums of squares divided by the number of pixels in said pixel group mode is equal to said variance of noise, and reduces the weight for the pixel value obtained from said former weighted addition as the difference between the minimum value of said total sum of residual sums of squares divided by the number of pixels in said pixel group mode and said variance of noise becomes larger.

According to the invention in this aspect, in the image processing as described regarding (30), since the function is a function which makes a weight for the pixel value obtained from the former weighted addition maximum when the minimum value of the total sum of residual sums of squares divided by the number of pixels in the pixel group mode is equal to the variance of noise, and reduces the weight for the pixel value obtained from the former weighted addition as the difference between the minimum value of the total sum of residual sums of squares divided by the number of pixels in the pixel group mode and the variance of noise becomes larger, filtering can be performed without corrupting a characteristic structure in the original image.

(32) The present invention, in accordance with still another aspect thereof for solving the aforementioned problem, is the image processing apparatus as described regarding any one of (23)–(31), characterized in that said selecting of a pixel group mode is performed by selecting a pixel group mode in which said total sum of residual sums of squares of pixel values of the pixel groups is minimum.

According to the invention in this aspect, in the image processing as described regarding any one of (23)–(31), since the selecting of a pixel group mode is performed by selecting a pixel group mode in which the total sum of residual sums of squares of pixel values of the pixel groups is minimum, a pixel group mode can be selected which best fits a structure in the original image.

(33) The present invention, in accordance with still another aspect thereof for solving the aforementioned problem, is the image processing apparatus as described regarding any one of (23)–(31), characterized in that said selecting of a pixel group mode is performed by selecting a pixel group mode in which said total sum of residual sums of squares of pixel values of the pixel groups is closest to the variance of noise of said original image multiplied by the number of pixels in the pixel group mode.

According to the invention in this aspect, in the image processing as described regarding any one of (23)–(31), since the selecting of a pixel group mode is performed by selecting a pixel group mode in which the total sum of residual sums of squares of pixel values of the pixel groups is closest to the variance of noise of the original image multiplied by the number of pixels in the pixel group mode, a pixel group mode can be selected which best fits a structure in the original image.

(34) The present invention, in accordance with still another aspect thereof for solving the aforementioned problem, is an image processing apparatus characterized in that the apparatus comprises: region defining means for defining in a plurality of modes a local region containing a pixel of interest in an original image; pixel group defining means for defining in a plurality of modes a pixel group consisting of a plurality of pixels containing said pixel of interest and a pixel group(s) consisting of a plurality of pixels not overlapping those in the former pixel group, in each of said defined plurality of modes of region; selecting means for selecting a pixel group mode from said defined plurality of pixel group modes which best fits a structure of said original image in said region throughout said defined plurality of modes of region; and image producing means for producing an image using an average pixel value of said pixel group containing the pixel of interest in said selected pixel group mode, as a new pixel value for said pixel of interest.

According to the invention in this aspect, since a pixel group mode is selected which best fits a structure of the original image in a region throughout a plurality of modes of region, and in that pixel group mode, the average pixel value of the pixel group containing the pixel of interest is used as a new pixel value for the pixel of interest, filtering less liable to generate a false structure can be performed.

(35) The present invention, in accordance with still another aspect thereof for solving the aforementioned problem, is an image processing apparatus characterized in that the apparatus comprises: region defining means for defining in a plurality of modes a local region containing a pixel of interest in an original image; pixel group defining means for defining in a plurality of modes a pixel group consisting of a plurality of pixels containing said pixel of interest and a pixel group(s) consisting of a plurality of pixels not overlapping those in the former pixel group, in each of said defined plurality of modes of region; selecting means for selecting a pixel group mode from said defined plurality of pixel group modes which best fits a structure of said original image in said region throughout said defined plurality of modes of region; first pixel value calculating means for calculating an average pixel value of said pixel group containing the pixel of interest in said selected pixel group mode; second pixel value calculating means for calculating an average pixel value of said region in one of said plurality of modes of region in which said selected pixel group mode is defined; and image producing means for producing an image using a pixel value obtained from a weighted addition of said average pixel value of the pixel group and said average pixel value of the region, as a new pixel value for said pixel of interest.

According to the invention in this aspect, since a new pixel value for the pixel of interest is obtained from a weighted addition of the average pixel value of a pixel group calculated in a manner similar to (34) and the average pixel value of a region, filtering yet less liable to generate a false structure can be performed.

(36) The present invention, in accordance with still another aspect thereof for solving the aforementioned problem, is an image processing apparatus characterized in that the apparatus comprises: region defining means for defining in a plurality of modes a local region containing a pixel of interest in an original image; pixel group defining means for defining in a plurality of modes a pixel group consisting of a plurality of pixels containing said pixel of interest and a pixel group(s) consisting of a plurality of pixels not overlapping those in the former pixel group, in each of said defined plurality of modes of region; selecting means for selecting a pixel group mode from said defined plurality of pixel group modes which best fits a structure of said original image in said region throughout said defined plurality of modes of region; first pixel value calculating means for calculating an average pixel value of said pixel group containing the pixel of interest in said selected pixel group mode; second pixel value calculating means for calculating an average pixel value of said region in one of said plurality of modes of region in which said selected pixel group mode is defined; addition means for performing a weighted addition on said average pixel value of the pixel group and said average pixel value of the region; and image producing means for producing an image using a pixel value obtained from a weighted addition of the pixel value obtained from said former weighted addition and a pixel value of said pixel of interest, as a new pixel value for said pixel of interest.

According to the invention in this aspect, since a new pixel value for the pixel of interest is obtained from a weighted addition of the pixel value calculated in a manner similar to (35) and the pixel value of the pixel of interest in the original image, filtering can be performed without corrupting a characteristic structure in the original image.

(37) The present invention, in accordance with still another aspect thereof for solving the aforementioned problem, is an image processing apparatus characterized in that the apparatus comprises: region defining means for defining in a plurality of modes a local region containing a pixel of interest in an original image; pixel group defining means for defining in a plurality of modes a pixel group consisting of a plurality of pixels containing said pixel of interest and a pixel group(s) consisting of a plurality of pixels not overlapping those in the former pixel group, in each of said defined plurality of modes of region; selecting means for selecting a pixel group mode from said defined plurality of pixel group modes which best fits a structure of said original image in said region throughout said defined plurality of modes of region; first pixel value calculating means for calculating an average pixel value of said pixel group containing the pixel of interest in said selected pixel group mode; second pixel value calculating means for calculating an average pixel value of said region in one of said plurality of modes of region in which said selected pixel group mode is defined; first addition means for performing a weighted addition on said average pixel value of the pixel group and said average pixel value of the region; image producing means for producing an image using a pixel value obtained from a weighted addition of the pixel value obtained from said former weighted addition and a pixel value of said pixel of interest, as a new pixel value for said pixel of interest; and second addition means for performing a weighted addition on said produced image and said original image.

According to the invention in this aspect, since a weighted addition is performed on an image produced by the pixel value calculated in a manner similar to (36) and the original image, the effect of filtering can be mitigated.

(38) The present invention, in accordance with still another aspect thereof for solving the aforementioned problem, is the image processing apparatus as described regarding (37), characterized in that a weighting factor for said weighted addition of said produced image and said original image is adjustable.

According to the invention in this aspect, the effect of filtering can be adjusted by adjusting a weighting factor.

(39) The present invention, in accordance with still another aspect thereof for solving the aforementioned problem, is the image processing apparatus as described regarding any one of (35)–(38), characterized in that a weighting factor for said weighted addition of said average pixel value of the pixel group and said average pixel value of the region is a function of a minimum value and a maximum value of a total sum of respective residual sums of squares of pixel values of said pixel groups, said total sum being calculated for each of said image group modes throughout said defined plurality of modes of region.

According to the invention in this aspect, in the image processing as described regarding (35)–(38), since a weighting factor for the weighted addition of the average pixel value of a pixel group and the average pixel value of a region is a function of a minimum value and a maximum value of a total sum of respective residual sums of squares of pixel values of the pixel groups, the total sum being calculated for each of the pixel group modes throughout a plurality of modes of region, filtering less liable to generate a false structure can be performed.

(40) The present invention, in accordance with still another aspect thereof for solving the aforementioned problem, is the image processing apparatus as described regarding (39), characterized in that said function is a function which makes a weight for said average pixel value of the region maximum when the minimum value and the maximum value of said total sum of residual sums of squares are equal, and reduces the weight for said average pixel value of the region as the minimum value of said total sum of residual sums of squares becomes smaller with respect to the maximum value.

According to the invention in this aspect, in the image processing as described regarding (39), since the function is a function which makes a weight for the average pixel value of a region maximum when the minimum value and the maximum value of the total sum of residual sums of squares are equal, and reduces the weight for the average pixel value of a region as the minimum value of the total sum of residual sums of squares becomes smaller with respect to the maximum value, filtering less liable to generate a false structure can be performed.

(41) The present invention, in accordance with still another aspect thereof for solving the aforementioned problem, is the image processing apparatus as described regarding any one of (36)–(40), characterized in that a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said image group modes throughout said defined plurality of modes of region, and the variance of noise of said original image.

According to the invention in this aspect, in the image processing as described regarding any one of (36)–(40), since a weighting factor for the weighted addition of the pixel value obtained from the former weighted addition and the pixel value of the pixel of interest in the original image is a function of the minimum value of the total sum of residual sums of squares of pixel values of the pixel groups, the total sum being calculated for each of pixel group modes throughout a plurality of modes of region, and the variance of noise of the original image, filtering can be performed without corrupting a characteristic structure in the original image.

(42) The present invention, in accordance with still another aspect thereof for solving the aforementioned problem, is the image processing apparatus as described regarding (41), characterized in that said function is a function which makes a weight for the pixel value obtained from said former weighted addition maximum when the minimum value of said total sum of residual sums of squares divided by the number of pixels in said pixel group mode is equal to said variance of noise, and reduces the weight for the pixel value obtained from said former weighted addition as the difference between the minimum value of said total sum of residual sums of squares divided by the number of pixels in said pixel group mode and said variance of noise becomes larger.

According to the invention in this aspect, in the image processing as described regarding (41), since the function is a function which makes a weight for the pixel value obtained from the former weighted addition maximum when the minimum value of the total sum of residual sums of squares divided by the number of pixels in the pixel group mode is equal to the variance of noise, and reduces the weight for the pixel value obtained from the former weighted addition as the difference between the minimum value of the total sum of residual sums of squares divided by the number of pixels in the pixel group mode and the variance of noise becomes larger, filtering can be performed without corrupting a characteristic structure in the original image.

(43) The present invention, in accordance with still another aspect thereof for solving the aforementioned problem, is the image processing apparatus as described regarding any one of (34)–(42), characterized in that said selecting of a pixel group mode is performed by selecting an image group mode in which said total sum of residual sums of squares of pixel values of the pixel groups is minimum throughout said defined plurality of modes of region.

According to the invention in this aspect, in the image processing as described regarding any one of (34)–(42), since the selecting of a pixel group mode is performed by selecting a pixel group mode in which the total sum of residual sums of squares of pixel values of the pixel groups is minimum throughout a plurality of modes of region, a pixel group mode can be selected which best fits a structure in the original image.

(44) The present invention, in accordance with still another aspect thereof for solving the aforementioned problem, is the image processing apparatus as described regarding any one of (34)–(42), characterized in that said selecting of a pixel group mode is performed by selecting a pixel group mode in which said total sum of residual sums of squares of pixel values of the pixel groups is closest to the variance of noise of said original image multiplied by the number of pixels in the pixel group mode.

According to the invention in this aspect, in the image processing as described regarding any one of (34)–(42), since the selecting of a pixel group mode is performed by selecting a pixel group mode in which the total sum of residual sums of squares of pixel values of the pixel groups is closest to the variance of noise of the original image multiplied by the number of pixels in the pixel group mode, a pixel group mode can be selected which best fits a structure in the original image.

(45) The present invention, in accordance with still another aspect thereof for solving the aforementioned problem, is a recording medium characterized in that the medium records in a computer-readable manner a program for a computer to perform the functions of: defining a local region containing a pixel of interest in an original image; defining in a plurality of modes a pixel group consisting of a plurality of pixels containing said pixel of interest and a pixel group(s) consisting of a plurality of pixels not overlapping those in the former pixel group, in said region; selecting a pixel group mode from said defined plurality of pixel group modes which best fits a structure of said original image in said region; and producing an image using an average pixel value of said pixel group containing the pixel of interest in said selected pixel group mode, as a new pixel value for said pixel of interest.

According to the invention in this aspect, since the program recorded on the recording medium makes a computer perform the functions of selecting a pixel group mode which best fits a structure in the original image, and in that pixel group mode, using the average pixel value of the pixel group containing the pixel of interest as a new pixel value for the pixel of interest, filtering less liable to generate a false structure can be performed.

(46) The present invention, in accordance with still another aspect thereof for solving the aforementioned problem, is a recording medium characterized in that the medium records in a computer-readable manner a program for a computer to perform the functions of: defining a local region containing a pixel of interest in an original image; defining in a plurality of modes a pixel group consisting of a plurality of pixels containing said pixel of interest and a pixel group(s) consisting of a plurality of pixels not overlapping those in the former pixel group, in said region; selecting a pixel group mode from said defined plurality of pixel group modes which best fits a structure of said original image in said region; calculating an average pixel value of said pixel group containing the pixel of interest in said selected pixel group mode, calculating an average pixel value of said region; and producing an image using a pixel value obtained from a weighted addition of said average pixel value of the pixel group and said average pixel value of the region, as a new pixel value for said pixel of interest.

According to the invention in this aspect, since the program recorded on the recording medium makes a computer perform the function of obtaining a new pixel value for the pixel of interest from a weighted addition of the average pixel value of a pixel group calculated in a manner similar to (45) and the average pixel value of a region, filtering yet less liable to generate a false structure can be performed.

(47) The present invention, in accordance with still another aspect thereof for solving the aforementioned problem, is a recording medium characterized in that the medium records in a computer-readable manner a program for a computer to perform the functions of: defining a local region containing a pixel of interest in an original image; defining in a plurality of modes a pixel group consisting of a plurality of pixels containing said pixel of interest and a pixel group(s) consisting of a plurality of pixels not overlapping those in the former pixel group, in said region; selecting a pixel group mode from said defined plurality of pixel group modes which best fits a structure of said original image in said region; calculating an average pixel value of said pixel group containing the pixel of interest in said selected pixel group mode; calculating an average pixel value of said region; performing a weighted addition on said average pixel value of the pixel group and said average pixel value of the region; and producing an image using a pixel value obtained from a weighted addition of the pixel value obtained from said former weighted addition and a pixel value of said pixel of interest, as a new pixel value for said pixel of interest.

According to the invention in this aspect, since the program recorded on the recording medium makes a computer perform the function of obtaining a new pixel value for the pixel of interest from a weighted addition of the pixel value calculated in a manner similar to (46) and the pixel value of the pixel of interest in the original image, filtering can be performed without corrupting a characteristic structure in the original image.

(48) The present invention, in accordance with still another aspect thereof for solving the aforementioned problem, is a recording medium characterized in that the medium records in a computer-readable manner a program for a computer to perform the functions of: defining a local region containing a pixel of interest in an original image; defining in a plurality of modes a pixel group consisting of a plurality of pixels containing said pixel of interest and a pixel group(s) consisting of a plurality of pixels not overlapping those in the former pixel group, in said region; selecting a pixel group mode from said defined plurality of pixel group modes which best fits a structure of said original image in said region; calculating an average pixel value of said pixel group containing the pixel of interest in said selected pixel group mode; calculating an average pixel value of said region; performing a weighted addition on said average pixel value of the pixel group and said average pixel value of the region; producing an image using a pixel value obtained from a weighted addition of the pixel value obtained from said former weighted addition and a pixel value of said pixel of interest, as a new pixel value for said pixel of interest; and performing a weighted addition on said produced image and said original image.

According to the invention in this aspect, since the program recorded on the recording medium makes a computer perform the function of performing a weighted addition on an image produced by the pixel value calculated in a manner similar to (47) and the original image, the effect of filtering can be mitigated.

(49) The present invention, in accordance with still another aspect thereof for solving the aforementioned problem, is the recording medium as described regarding (48), characterized in that a weighting factor for said weighted addition of said produced image and said original image is adjustable.

According to the invention in this aspect, the effect of filtering can be adjusted by adjusting a weighting factor.

(50) The present invention, in accordance with still another aspect thereof for solving the aforementioned problem, is the recording medium as described regarding any one of (46)–(49), characterized in that a weighting factor for said weighted addition of said average pixel value of the pixel group and said average pixel value of the region is a function of a minimum value and a maximum value of a total sum of respective residual sums of squares of pixel values of said pixel groups, said total sum being calculated for each of said pixel group modes.

According to the invention in this aspect, in the image processing as described regarding any one of (46)–(49), since a weighting factor for the weighted addition of the average pixel value of a pixel group and the average pixel value of a region is a function of a minimum value and a maximum value of a total sum of respective residual sums of squares of pixel values of the pixel groups, the total sum being calculated for each of the pixel group modes, filtering less liable to generate a false structure can be performed.

(51) The present invention, in accordance with still another aspect thereof for solving the aforementioned problem, is the recording medium as described regarding (50), characterized in that said function is a function which makes a weight for said average pixel value of the region maximum when the minimum value and the maximum value of said total sum of residual sums of squares are equal, and reduces the weight for said average pixel value of the region as the minimum value of said total sum of residual sums of squares becomes smaller with respect to the maximum value.

According to the invention in this aspect, in the image processing as described regarding (50), since the function is a function which makes a weight for the average pixel value of a region maximum when the minimum value and the maximum value of the total sum of residual sums of squares are equal, and reduces the weight for the average pixel value of a region as the minimum value of the total sum of residual sums of squares becomes smaller with respect to the maximum value, filtering less liable to generate a false structure can be performed.

(52) The present invention, in accordance with still another aspect thereof for solving the aforementioned problem, is the recording medium as described regarding any one of (47)–(5), characterized in that a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said pixel group modes, and the variance of noise of said original image.

According to the invention in this aspect, in the image processing as described regarding (47)–(51), since a weighting factor for the weighted addition of the pixel value obtained from the former weighted addition and the pixel value of the pixel of interest in the original image is a function of the minimum value of the total sum of residual sums of squares of pixel values of the pixel groups, the total sum being calculated for each of pixel group modes, and the variance of noise of the original image, filtering can be performed without corrupting a characteristic structure in the original image.

(53) The present invention, in accordance with still another aspect thereof for solving the aforementioned problem, is the recording medium as described regarding (52), characterized in that said function is a function which makes a weight for the pixel value obtained from said former weighted addition maximum when the minimum value of said total sum of residual sums of squares divided by the number of pixels in said pixel group mode is equal to said variance of noise, and reduces the weight for the pixel value obtained from said former weighted addition as the difference between the minimum value of said total sum of residual sums of squares divided by the number of pixels in said pixel group mode and said variance of noise becomes larger.

According to the invention in this aspect, in the image processing as described regarding (52), since the function is a function which makes a weight for the pixel value obtained from the former weighted addition maximum when the minimum value of the total sum of residual sums of squares divided by the number of pixels in the pixel group mode is equal to the variance of noise, and reduces the weight for the pixel value obtained from the former weighted addition as the difference between the minimum value of the total sum of residual sums of squares divided by the number of pixels in the pixel group mode and the variance of noise becomes larger, filtering can be performed without corrupting a characteristic structure in the original image.

(54) The present invention, in accordance with still another aspect thereof for solving the aforementioned problem, is the recording medium as described regarding any one of (45)–(53), characterized in that said selecting of a pixel group mode is performed by selecting a pixel group mode in which said total sum of residual sums of squares of pixel values of the pixel groups is minimum.

According to the invention in this aspect, in the image processing as described regarding any one of (45)–(53), since the selecting of a pixel group mode is performed by selecting a pixel group mode in which the total sum of residual sums of squares of pixel values of the pixel groups is minimum, a pixel group mode can be selected which best fits a structure in the original image.

(55) The present invention, in accordance with still another aspect thereof for solving the aforementioned problem, is the recording medium as described regarding any one of (45)–(53), characterized in that said selecting of a pixel group mode is performed by selecting a pixel group mode in which said total sum of residual sums of squares of pixel values of the pixel groups is closest to the variance of noise of said original image multiplied by the number of pixels in the pixel group mode.

According to the invention in this aspect, in the image processing as described regarding any one of (45)–(53), since the selecting of a pixel group mode is performed by selecting a pixel group mode in which the total sum of residual sums of squares of pixel values of the pixel groups is closest to the variance of noise of the original image multiplied by the number of pixels in the pixel group mode, a pixel group mode can be selected which best fits a structure in the original image.

(56) The present invention, in accordance with still another aspect thereof for solving the aforementioned problem, is a recording medium characterized in that the medium records in a computer-readable manner a program for a computer to perform the functions of: defining in a plurality of modes a local region containing a pixel of interest in an original image; defining in a plurality of modes a pixel group consisting of a plurality of pixels containing said pixel of interest and a pixel group(s) consisting of a plurality of pixels not overlapping those in the former pixel group, in each of said defined plurality of modes of region; selecting a pixel group mode from said defined plurality of pixel group modes which best fits a structure of said original image in said region throughout said defined plurality of modes of region; and producing an image using an average pixel value of said pixel group containing the pixel of interest in said selected pixel group mode, as a new pixel value for said pixel of interest.

According to the invention in this aspect, since the program recorded on the recording medium makes a computer perform the functions of selecting a pixel group mode which best fits a structure of the original image in a region throughout a plurality of modes of region, and in that pixel group mode, using the average pixel value of the pixel group containing the pixel of interest as a new pixel value for the pixel of interest, filtering less liable to generate a false structure can be performed.

(57) The present invention, in accordance with still another aspect thereof for solving the aforementioned problem, is a recording medium characterized in that the medium records in a computer-readable manner a program for a computer to perform the functions of: defining in a plurality of modes a local region containing a pixel of interest in an original image; defining in a plurality of modes a pixel group consisting of a plurality of pixels containing said pixel of interest and a pixel group(s) consisting of a plurality of pixels not overlapping those in the former pixel group, in each of said defined plurality of modes of region; selecting a pixel group mode from said defined plurality of pixel group modes which best fits a structure of said original image in said region throughout said defined plurality of modes of region; calculating an average pixel value of said pixel group containing the pixel of interest in said selected pixel group mode; calculating an average pixel value of said region in one of said plurality of modes of region in which said selected pixel group mode is defined; and producing an image using a pixel value obtained from a weighted addition of said average pixel value of the pixel group and said average pixel value of the region, as a new pixel value for said pixel of interest.

According to the invention in this aspect, since the program recorded on the recording medium makes a computer perform the function of obtaining a new pixel value for the pixel of interest from a weighted addition of the average pixel value of a pixel group calculated in a manner similar to (56) and the average pixel value of a region, filtering yet less liable to generate a false structure can be performed.

(58) The present invention, in accordance with still another aspect thereof for solving the aforementioned problem, is a recording medium characterized in that the medium records in a computer-readable manner a program for a computer to perform the functions of: defining in a plurality of modes a local region containing a pixel of interest in an original image; defining in a plurality of modes a pixel group consisting of a plurality of pixels containing said pixel of interest and a pixel group(s) consisting of a plurality of pixels not overlapping those in the former pixel group, in each of said defined plurality of modes of region; selecting a pixel group mode from said defined plurality of pixel group modes which best fits a structure of said original image in said region throughout said defined plurality of modes of region; calculating an average pixel value of said pixel group containing the pixel of interest in said selected pixel group mode; calculating an average pixel value of said region in one of said plurality of modes of region in which said selected pixel group mode is defined; performing a weighted addition on said average pixel value of the pixel group and said average pixel value of the region; and producing an image using a pixel value obtained from a weighted addition of the pixel value obtained from said former weighted addition and a pixel value of said pixel of interest, as a new pixel value for said pixel of interest.

According to the invention in this aspect, since the program recorded on the recording medium makes a computer perform the function of obtaining a new pixel value for the pixel of interest from a weighted addition of the pixel value calculated in a manner similar to (57) and the pixel value of the pixel of interest in the original image, filtering can be performed without corrupting a characteristic structure in the original image.

(59) The present invention, in accordance with still another aspect thereof for solving the aforementioned problem, is a recording medium characterized in that the medium records in a computer-readable manner a program for a computer to perform the functions of: defining in a plurality of modes a local region containing a pixel of interest in an original image; defining in a plurality of modes a pixel group consisting of a plurality of pixels containing said pixel of interest and a pixel group(s) consisting of a plurality of pixels not overlapping those in the former pixel group, in each of said defined plurality of modes of region; selecting a pixel group mode from said defined plurality of pixel group modes which best fits a structure of said original image in said region throughout said defined plurality of modes of region; calculating an average pixel value of said pixel group containing the pixel of interest in said selected pixel group mode; calculating an average pixel value of said region in one of said plurality of modes of region in which said selected pixel group mode is defined; performing a weighted addition on said average pixel value of the pixel group and said average pixel value of the region; producing an image using a pixel value obtained from a weighted addition of the pixel value obtained from said former weighted addition and a pixel value of said pixel of interest, as a new pixel value for said pixel of interest; and performing a weighted addition on said produced image and said original image.

According to the invention in this aspect, since the program recorded on the recording medium makes a computer perform the function of performing a weighted addition on an image produced by the pixel value calculated in a manner similar to (58) and the original image, the effect of filtering can be mitigated.

(60) The present invention, in accordance with still another aspect thereof for solving the aforementioned problem, is the recording medium as described regarding (59), characterized in that a weighting factor for said weighted addition of said produced image and said original image is adjustable.

According to the invention in this aspect, the effect of filtering can be adjusted by adjusting a weighting factor.

(61) The present invention, in accordance with still another aspect thereof for solving the aforementioned problem, is the recording medium as described regarding any one of (57)–(60), characterized in that a weighting factor for said weighted addition of said average pixel value of the pixel group and said average pixel value of the region is a function of a minimum value and a maximum value of a total sum of respective residual sums of squares of pixel values of said pixel groups, said total sum being calculated for each of said image group modes throughout said defined plurality of modes of region.

According to the invention in this aspect, in the image processing as described regarding (57)–(60), since a weighting factor for the weighted addition of the average pixel value of a pixel group and the average pixel value of a region is a function of a minimum value and a maximum value of a total sum of respective residual sums of squares of pixel values of the pixel groups, the total sum being calculated for each of the pixel group modes throughout a plurality of modes of region, filtering less liable to generate a false structure can be performed.

(62) The present invention, in accordance with still another aspect thereof for solving the aforementioned problem, is the recording medium as described regarding (61), characterized in that said function is a function which makes a weight for said average pixel value of the region maximum when the minimum value and the maximum value of said total sum of residual sums of squares are equal, and reduces the weight for said average pixel value of the region as the minimum value of said total sum of residual sums of squares becomes smaller with respect to the maximum value.

According to the invention in this aspect, in the image processing as described regarding (61), since the function is a function which makes a weight for the average pixel value of a region maximum when the minimum value and the maximum value of the total sum of residual sums of squares are equal, and reduces the weight for the average pixel value of a region as the minimum value of the total sum of residual sums of squares becomes smaller with respect to the maximum value, filtering less liable to generate a false structure can be performed.

(63) The present invention, in accordance with still another aspect thereof for solving the aforementioned problem, is the recording medium as described regarding any one of (58)–(62), characterized in that a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said image group modes throughout said defined plurality of modes of region, and the variance of noise of said original image.

According to the invention in this aspect, in the image processing as described regarding any one of (58)–(62), since a weighting factor for the weighted addition of the pixel value obtained from the former weighted addition and the pixel value of the pixel of interest in the original image is a function of the minimum value of the total sum of residual sums of squares of pixel values of the pixel groups, the total sum being calculated for each of pixel group modes throughout a plurality of modes of region, and the variance of noise of the original image, filtering can be performed without corrupting a characteristic structure in the original image.

(64) The present invention, in accordance with still another aspect thereof for solving the aforementioned problem, is the recording medium as described regarding (63), characterized in that said function is a function which makes a weight for the pixel value obtained from said former weighted addition maximum when the minimum value of said total sum of residual sums of squares divided by the number of pixels in said pixel group mode is equal to said variance of noise, and reduces the weight for the pixel value obtained from said former weighted addition as the difference between the minimum value of said total sum of residual sums of squares divided by the number of pixels in said pixel group mode and said variance of noise becomes larger.

According to the invention in this aspect, in the image processing as described regarding (63), since the function is a function which makes a weight for the pixel value obtained from the former weighted addition maximum when the minimum value of the total sum of residual sums of squares divided by the number of pixels in the pixel group mode is equal to the variance of noise, and reduces the weight for the pixel value obtained from the former weighted addition as the difference between the minimum value of the total sum of residual sums of squares divided by the number of pixels in the pixel group mode and the variance of noise becomes larger, filtering can be performed without corrupting a characteristic structure in the original image.

(65) The present invention, in accordance with still another aspect thereof for solving the aforementioned problem, is the recording medium as described regarding any one of (56)–(64), characterized in that said selecting of a pixel group mode is performed by selecting an image group mode in which said total sum of residual sums of squares of pixel values of the pixel groups is minimum throughout said defined plurality of modes of region.

According to the invention in this aspect, in the image processing as described regarding any one of (56)–(64), since the selecting of a pixel group mode is performed by selecting a pixel group mode in which the total sum of residual sums of squares of pixel values of the pixel groups is minimum throughout a plurality of modes of region, a pixel group mode can be selected which best fits a structure in the original image.

(66) The present invention, in accordance with still another aspect thereof for solving the aforementioned problem, is the recording medium as described regarding any one of (56)–(64), characterized in that said selecting of a pixel group mode is performed by selecting a pixel group mode in which said total sum of residual sums of squares of pixel values of the pixel groups is closest to the variance of noise of said original image multiplied by the number of pixels in the pixel group mode.

According to the invention in this aspect, in the image processing as described regarding any one of (56)–(64), since the selecting of a pixel group mode is performed by selecting a pixel group mode in which the total sum of residual sums of squares of pixel values of the pixel groups is closest to the variance of noise of the original image multiplied by the number of pixels in the pixel group mode, a pixel group mode can be selected which best fits a structure in the original image.

(67) The present invention, in accordance with still another aspect thereof for solving the aforementioned problem, is an imaging apparatus characterized in that the apparatus comprises: signal collecting means for collecting a signal from an object; original image producing means for producing an original image based on said collected signal; region defining means for defining a local region containing a pixel of interest in said original image; pixel group defining means for defining in a plurality of modes a pixel group consisting of a plurality of pixels containing said pixel of interest and a pixel group(s) consisting of a plurality of pixels not overlapping those in the former pixel group, in said region; selecting means for selecting a pixel group mode from said defined plurality of pixel group modes which best fits a structure of said original image in said region; and image producing means for producing an image using an average pixel value of said pixel group containing the pixel of interest in said selected pixel group mode, as a new pixel value for said pixel of interest.

According to the invention in this aspect, since a pixel group mode is selected which best fits a structure in the original image, and in that pixel group mode, the average pixel value of the pixel group containing the pixel of interest is used as a new pixel value for the pixel of interest, an image can be obtained which is processed with filtering less liable to generate a false structure.

(68) The present invention, in accordance with still another aspect thereof for solving the aforementioned problem, is an imaging apparatus characterized in that the apparatus comprises: signal collecting means for collecting a signal from an object; original image producing means for producing an original image based on said collected signal; region defining means for defining a local region containing a pixel of interest in said original image; pixel group defining means for defining in a plurality of modes a pixel group consisting of a plurality of pixels containing said pixel of interest and a pixel group(s) consisting of a plurality of pixels not overlapping those in the former pixel group, in said region; selecting means for selecting a pixel group mode from said defined plurality of pixel group modes which best fits a structure of said original image in said region; first pixel value calculating means for calculating an average pixel value of said pixel group containing the pixel of interest in said selected pixel group mode; second pixel value calculating means for calculating an average pixel value of said region; and image producing means for producing an image using a pixel value obtained from a weighted addition of said average pixel value of the pixel group and said average pixel value of the region, as a new pixel value for said pixel of interest.

According to the invention in this aspect, since a new pixel value for the pixel of interest is obtained from a weighted addition of the average pixel value of a pixel group calculated in a manner similar to (67) and the average pixel value of a region, an image can be obtained which is processed with filtering yet less liable to generate a false structure.

(69) The present invention, in accordance with still another aspect thereof for solving the aforementioned problem, is an imaging apparatus characterized in that the apparatus comprises: signal collecting means for collecting a signal from an object; original image producing means for producing an original image based on said collected signal; region defining means for defining a local region containing a pixel of interest in said original image; pixel group defining means for defining in a plurality of modes a pixel group consisting of a plurality of pixels containing said pixel of interest and a pixel group(s) consisting of a plurality of pixels not overlapping those in the former pixel group, in said region; selecting means for selecting a pixel group mode from said defined plurality of pixel group modes which best fits a structure of said original image in said region; first pixel value calculating means for calculating an average pixel value of said pixel group containing the pixel of interest in said selected pixel group mode; second pixel value calculating means for calculating an average pixel value of said region; addition means for performing a weighted addition on said average pixel value of the pixel group and said average pixel value of the region; and image producing means for producing an image using a pixel value obtained from a weighted addition of the pixel value obtained from said former weighted addition and a pixel value of said pixel of interest, as a new pixel value for said pixel of interest.

According to the invention in this aspect, since a new pixel value for the pixel of interest is obtained from a weighted addition of the pixel value calculated in a manner similar to (68) and the pixel value of the pixel of interest in the original image, an image can be obtained which is processed with filtering not corrupting a characteristic structure in the original image.

(70) The present invention, in accordance with still another aspect thereof for solving the aforementioned problem, is an imaging apparatus characterized in that the apparatus comprises: signal collecting means for collecting a signal from an object; original image producing means for producing an original image based on said collected signal; region defining means for defining a local region containing a pixel of interest in said original image; pixel group defining means for defining in a plurality of modes a pixel group consisting of a plurality of pixels containing said pixel of interest and a pixel group(s) consisting of a plurality of pixels not overlapping those in the former pixel group, in said region; selecting means for selecting a pixel group mode from said defined plurality of pixel group modes which best fits a structure of said original image in said region; first pixel value calculating means for calculating an average pixel value of said pixel group containing the pixel of interest in said selected pixel group mode; second pixel value calculating means for calculating an average pixel value of said region; first addition means for performing a weighted addition on said average pixel value of the pixel group and said average pixel value of the region; image producing means for producing an image using a pixel value obtained from a weighted addition of the pixel value obtained from said former weighted addition and a pixel value of said pixel of interest, as a new pixel value for said pixel of interest; and second addition means for performing a weighted addition on said produced image and said original image.

According to the invention in this aspect, since a weighted addition is performed on an image produced by the pixel value calculated in a manner similar to (69) and the original image, the effect of filtering can be mitigated.

(71) The present invention, in accordance with still another aspect thereof for solving the aforementioned problem, is the imaging apparatus as described regarding (70), characterized in that a weighting factor for said weighted addition of said produced image and said original image is adjustable.

According to the invention in this aspect, the effect of filtering can be adjusted by adjusting a weighting factor.

(72) The present invention, in accordance with still another aspect thereof for solving the aforementioned problem, is the imaging apparatus as described regarding any one of (68)–(71), characterized in that a weighting factor for said weighted addition of said average pixel value of the pixel group and said average pixel value of the region is a function of a minimum value and a maximum value of a total sum of respective residual sums of squares of pixel values of said pixel groups, said total sum being calculated for each of said pixel group modes.

According to the invention in this aspect, in the image processing as described regarding (68)–(71), since a weighting factor for the weighted addition of the average pixel value of a pixel group and the average pixel value of a region is a function of a minimum value and a maximum value of a total sum of respective residual sums of squares of pixel values of the pixel groups, the total sum being calculated for each of the pixel group modes, an image can be obtained which is processed with filtering less liable to generate a false structure.

(73) The present invention, in accordance with still another aspect thereof for solving the aforementioned problem, is the imaging apparatus as described regarding (72), characterized in that said function is a function which makes a weight for said average pixel value of the region maximum when the minimum value and the maximum value of said total sum of residual sums of squares are equal, and reduces the weight for said average pixel value of the region as the minimum value of said total sum of residual sums of squares becomes smaller with respect to the maximum value.

According to the invention in this aspect, in the image processing as described regarding (72), since the function is a function which makes a weight for the average pixel value of a region maximum when the minimum value and the maximum value of the total sum of residual sums of squares are equal, and reduces the weight for the average pixel value of a region as the minimum value of the total sum of residual sums of squares becomes smaller with respect to the maximum value, filtering less liable to generate a false structure can be performed.

(74) The present invention, in accordance with still another aspect thereof for solving the aforementioned problem, is the imaging apparatus as described regarding any one of (69)–(73), characterized in that a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said pixel group modes, and the variance of noise of said original image.

According to the invention in this aspect, in the image processing as described regarding (69)–(73), since a weighting factor for the weighted addition of the pixel value obtained from the former weighted addition and the pixel value of the pixel of interest in the original image is a function of the minimum value of the total sum of residual sums of squares of pixel values of the pixel groups, the total sum being calculated for each of pixel group modes, and the variance of noise of the original image, an image can be obtained which is processed with filtering not corrupting a characteristic structure in the original image.

(75) The present invention, in accordance with still another aspect thereof for solving the aforementioned problem, is the imaging apparatus as described regarding (74), characterized in that said function is a function which makes a weight for the pixel value obtained from said former weighted addition maximum when the minimum value of said total sum of residual sums of squares divided by the number of pixels in said pixel group mode is equal to said variance of noise, and reduces the weight for the pixel value obtained from said former weighted addition as the difference between the minimum value of said total sum of residual sums of squares divided by the number of pixels in said pixel group mode and said variance of noise becomes larger.

According to the invention in this aspect, in the image processing as described regarding (74), since the function is a function which makes a weight for the pixel value obtained from the former weighted addition maximum when the minimum value of the total sum of residual sums of squares divided by the number of pixels in the pixel group mode is equal to the variance of noise, and reduces the weight for the pixel value obtained from the former weighted addition as the difference between the minimum value of the total sum of residual sums of squares divided by the number of pixels in the pixel group mode and the variance of noise becomes larger, filtering can be performed without corrupting a characteristic structure in the original image.

(76) The present invention, in accordance with still another aspect thereof for solving the aforementioned problem, is the imaging apparatus as described regarding any one of (67)–(75), characterized in that said selecting of a pixel group mode is performed by selecting a pixel group mode in which said total sum of residual sums of squares of pixel values of the pixel groups is minimum.

According to the invention in this aspect, in the image processing as described regarding any one of (67)–(75), since the selecting of a pixel group mode is performed by selecting a pixel group mode in which the total sum of residual sums of squares of pixel values of the pixel groups is minimum, a pixel group mode can be selected which best fits a structure in the original image.

(77) The present invention, in accordance with still another aspect thereof for solving the aforementioned problem, is the imaging apparatus as described regarding any one of (67)–(75), characterized in that said selecting of a pixel group mode is performed by selecting a pixel group mode in which said total sum of residual sums of squares of pixel values of the pixel groups is closest to the variance of noise of said original image multiplied by the number of pixels in the pixel group mode.

According to the invention in this aspect, in the image processing as described regarding any one of (67)–(75), since the selecting of a pixel group mode is performed by selecting a pixel group mode in which the total sum of residual sums of squares of pixel values of the pixel groups is closest to the variance of noise of the original image multiplied by the number of pixels in the pixel group mode, a pixel group mode can be selected which best fits a structure in the original image.

(78) The present invention, in accordance with still another aspect thereof for solving the aforementioned problem, is an imaging apparatus characterized in that the apparatus comprises: signal collecting means for collecting a signal from an object; original image producing means for producing an original image based on said collected signal; region defining means for defining in a plurality of modes a local region containing a pixel of interest in said original image; pixel group defining means for defining in a plurality of modes a pixel group consisting of a plurality of pixels containing said pixel of interest and a pixel group(s) consisting of a plurality of pixels not overlapping those in the former pixel group, in each of said defined plurality of modes of region; selecting means for selecting a pixel group mode from said defined plurality of pixel group modes which best fits a structure of said original image in said region throughout said defined plurality of modes of region; and image producing means for producing an image using an average pixel value of said pixel group containing the pixel of interest in said selected pixel group mode, as a new pixel value for said pixel of interest.

According to the invention in this aspect, since a pixel group mode is selected which best fits a structure of the original image in a region throughout a plurality of modes of region, and in that pixel group mode, the average pixel value of the pixel group containing the pixel of interest is used as a new pixel value for the pixel of interest, an image can be obtained which is processed with filtering less liable to generate a false structure.

(79) The present invention, in accordance with still another aspect thereof for solving the aforementioned problem, is an imaging apparatus characterized in that the apparatus comprises: signal collecting means for collecting a signal from an object; original image producing means for producing an original image based on said collected signal; region defining means for defining in a plurality of modes a local region containing a pixel of interest in said original image; pixel group defining means for defining in a plurality of modes a pixel group consisting of a plurality of pixels containing said pixel of interest and a pixel group(s) consisting of a plurality of pixels not overlapping those in the former pixel group, in each of said defined plurality of modes of region; selecting means for selecting a pixel group mode from said defined plurality of pixel group modes which best fits a structure of said original image in said region throughout said defined plurality of modes of region; first pixel value calculating means for calculating an average pixel value of said pixel group containing the pixel of interest in said selected pixel group mode; second pixel value calculating means for calculating an average pixel value of said region in one of said plurality of modes of region in which said selected pixel group mode is defined; and image producing means for producing an image using a pixel value obtained from a weighted addition of said average pixel value of the pixel group and said average pixel value of the region, as a new pixel value for said pixel of interest.

According to the invention in this aspect, since a new pixel value for the pixel of interest is obtained from a weighted addition of the average pixel value of a pixel group calculated in a manner similar to (78) and the average pixel value of a region, an image can be obtained which is processed with filtering yet less liable to generate a false structure.

(80) The present invention, in accordance with still another aspect thereof for solving the aforementioned problem, is an imaging apparatus characterized in that the apparatus comprises: signal collecting means for collecting a signal from an object; original image producing means for producing an original image based on said collected signal; region defining means for defining in a plurality of modes a local region containing a pixel of interest in said original image; pixel value defining means defining in a plurality of modes a pixel group consisting of a plurality of pixels containing said pixel of interest and a pixel group(s) consisting of a plurality of pixels not overlapping those in the former pixel group, in each of said defined plurality of modes of region; selecting means for selecting a pixel group mode from said defined plurality of pixel group modes which best fits a structure of said original image in said region throughout said defined plurality of modes of region; first pixel value calculating means for calculating an average pixel value of said pixel group containing the pixel of interest in said selected pixel group mode; second pixel value calculating means for calculating an average pixel value of said region in one of said plurality of modes of region in which said selected pixel group mode is defined; addition means for performing a weighted addition on said average pixel value of the pixel group and said average pixel value of the region; and image producing means for producing an image using a pixel value obtained from a weighted addition of the pixel value obtained from said former weighted addition and a pixel value of said pixel of interest, as a new pixel value for said pixel of interest.

According to the invention in this aspect, since a new pixel value for the pixel of interest is obtained from a weighted addition of the pixel value calculated in a manner similar to (79) and the pixel value of the pixel of interest in the original image, an image can be obtained which is processed with filtering not corrupting a characteristic structure in the original image.

(81) The present invention, in accordance with still another aspect thereof for solving the aforementioned problem, is an imaging apparatus characterized in that the apparatus comprises: signal collecting means for collecting a signal from an object; original image producing means for producing an original image based on said collected signal; region defining means for defining in a plurality of modes a local region containing a pixel of interest in said original image; pixel group defining means for defining in a plurality of modes a pixel group consisting of a plurality of pixels containing said pixel of interest and a pixel group(s) consisting of a plurality of pixels not overlapping those in the former pixel group, in each of said defined plurality of modes of region; selecting means for selecting a pixel group mode from said defined plurality of pixel group modes which best fits a structure of said original image in said region throughout said defined plurality of modes of region; first pixel value calculating means for calculating an average pixel value of said pixel group containing the pixel of interest in said selected pixel group mode; second pixel value calculating means for calculating an average pixel value of said region in one of said plurality of modes of region in which said selected pixel group mode is defined; first addition means for performing a weighted addition on said average pixel value of the pixel group and said average pixel value of the region; image producing means for producing an image using a pixel value obtained from a weighted addition of the pixel value obtained from said former weighted addition and a pixel value of said pixel of interest, as a new pixel value for said pixel of interest; and second addition means for performing a weighted addition on said produced image and said original image.

According to the invention in this aspect, since a weighted addition is performed on an image produced by the pixel value calculated in a manner similar to (80) and the original image, the effect of filtering can be mitigated.

(82) The present invention, in accordance with still another aspect thereof for solving the aforementioned problem, is the imaging apparatus as described regarding (81), characterized in that a weighting factor for said weighted addition of said produced image and said original image is adjustable.

According to the invention in this aspect, the effect of filtering can be adjusted by adjusting a weighting factor.

(83) The present invention, in accordance with still another aspect thereof for solving the aforementioned problem, is the imaging apparatus as described regarding any one of (79)–(82), characterized in that a weighting factor for said weighted addition of said average pixel value of the pixel group and said average pixel value of the region is a function of a minimum value and a maximum value of a total sum of respective residual sums of squares of pixel values of said pixel groups, said total sum being calculated for each of said image group modes throughout said defined plurality of modes of region.

According to the invention in this aspect, in the image processing as described regarding (79)–(82), since a weighting factor for the weighted addition of the average pixel value of a pixel group and the average pixel value of a region is a function of a minimum value and a maximum value of a total sum of respective residual sums of squares of pixel values of the pixel groups, the total sum being calculated for each of the pixel group modes throughout a plurality of modes of region, an image can be obtained which is processed with filtering less liable to generate a false structure.

(84) The present invention, in accordance with still another aspect thereof for solving the aforementioned problem, is the imaging apparatus as described regarding (83), characterized in that said function is a function which makes a weight for said average pixel value of the region maximum when the minimum value and the maximum value of said total sum of residual sums of squares are equal, and reduces the weight for said average pixel value of the region as the minimum value of said total sum of residual sums of squares becomes smaller with respect to the maximum value.

According to the invention in this aspect, in the image processing as described regarding (83), since the function is a function which makes a weight for the average pixel value of a region maximum when the minimum value and the maximum value of the total sum of residual sums of squares are equal, and reduces the weight for the average pixel value of a region as the minimum value of the total sum of residual sums of squares becomes smaller with respect to the maximum value, filtering less liable to generate a false structure can be performed.

(85) The present invention, in accordance with still another aspect thereof for solving the aforementioned problem, is the imaging apparatus as described regarding any one of (80)–(84), characterized in that a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said image group modes throughout said defined plurality of modes of region, and the variance of noise of said original image.

According to the invention in this aspect, in the image processing as described regarding (80)–(84), since a weighting factor for the weighted addition of the pixel value obtained from the former weighted addition and the pixel value of the pixel of interest in the original image is a function of the minimum value of the total sum of residual sums of squares of pixel values of the pixel groups, the total sum being calculated for each of pixel group modes throughout a plurality of modes of region, and the variance of noise of the original image, an image can be obtained which is processed with filtering not corrupting a characteristic stricture in the original image.

(86) The present invention, in accordance with still another aspect thereof for solving the aforementioned problem, is the imaging apparatus as described regarding (85), characterized in that said function is a function which makes a weight for the pixel value obtained from said former weighted addition maximum when the minimum value of said total sum of residual sums of squares divided by the number of pixels in said pixel group mode is equal to said variance of noise, and reduces the weight for the pixel value obtained from said former weighted addition as the difference between the minimum value of said total sum of residual sums of squares divided by the number of pixels in said pixel group mode and said variance of noise becomes larger.

According to the invention in this aspect, in the image processing as described regarding (85), since the function is a function which makes a weight for the pixel value obtained from the former weighted addition maximum when the minimum value of the total sum of residual sums of squares divided by the number of pixels in the pixel group mode is equal to the variance of noise, and reduces the weight for the pixel value obtained from the former weighted addition as the difference between the minimum value of the total sum of residual sums of squares divided by the number of pixels in the pixel group mode and the variance of noise becomes larger, filtering can be performed without corrupting a characteristic structure in the original image.

(87) The present invention, in accordance with still another aspect thereof for solving the aforementioned problem, is the imaging apparatus as described regarding any one of (78)–(86), characterized in that said selecting of a pixel group mode is performed by selecting an image group mode in which said total sum of residual sums of squares of pixel values of the pixel groups is minimum throughout said defined plurality of modes of region.

According to the invention in this aspect, in the image processing as described regarding any one of (78)–(86), since the selecting of a pixel group mode is performed by selecting a pixel group mode in which the total sum of residual sums of squares of pixel values of the pixel groups is minimum throughout a plurality of modes of region, a pixel group mode can be selected which best fits a structure in the original image.

(88) The present invention, in accordance with still another aspect thereof for solving the aforementioned problem, is the imaging apparatus as described regarding any one of (78)–(86), characterized in that said selecting of a pixel group mode is performed by selecting a pixel group mode in which said total sum of residual sums of squares of pixel values of the pixel groups is closest to the variance of noise of said original image multiplied by the number of pixels in the pixel group mode.

According to the invention in this aspect, in the image processing as described regarding any one of (78)–(86), since the selecting of a pixel group mode is performed by selecting a pixel group mode in which the total sum of residual sums of squares of pixel values of the pixel groups is closest to the variance of noise of the original image multiplied by the number of pixels in the pixel group mode, a pixel group mode can be selected which best fits a structure in the original image.

(89) The present invention, in accordance with still another aspect thereof for solving the aforementioned problem, is the imaging apparatus as described regarding any one of (67)–(88), characterized in that said signal is a magnetic resonance signal.

According to the invention in this aspect, a magnetic resonance imaging apparatus comprising an image processing apparatus which performs proper filtering can be provided.

Therefore, the present invention can provide an image processing method and apparatus for properly performing filtering, a medium for recording a program for a computer to perform such an image processing function, and an imaging apparatus comprising such an image processing apparatus.

Further objects and advantages of the present invention will be apparent from the following description of the preferred embodiments of the invention as illustrated in the accompanying drawings.

BRIEF DESCRIPTION OF THE DRAWINGS

FIGS. 3A–3E are diagrams illustrating an exemplary pulse sequence executed by the apparatus shown in FIG. 1 or 2.

DETAILED DESCRIPTION OF THE INVENTION

Figure 1:
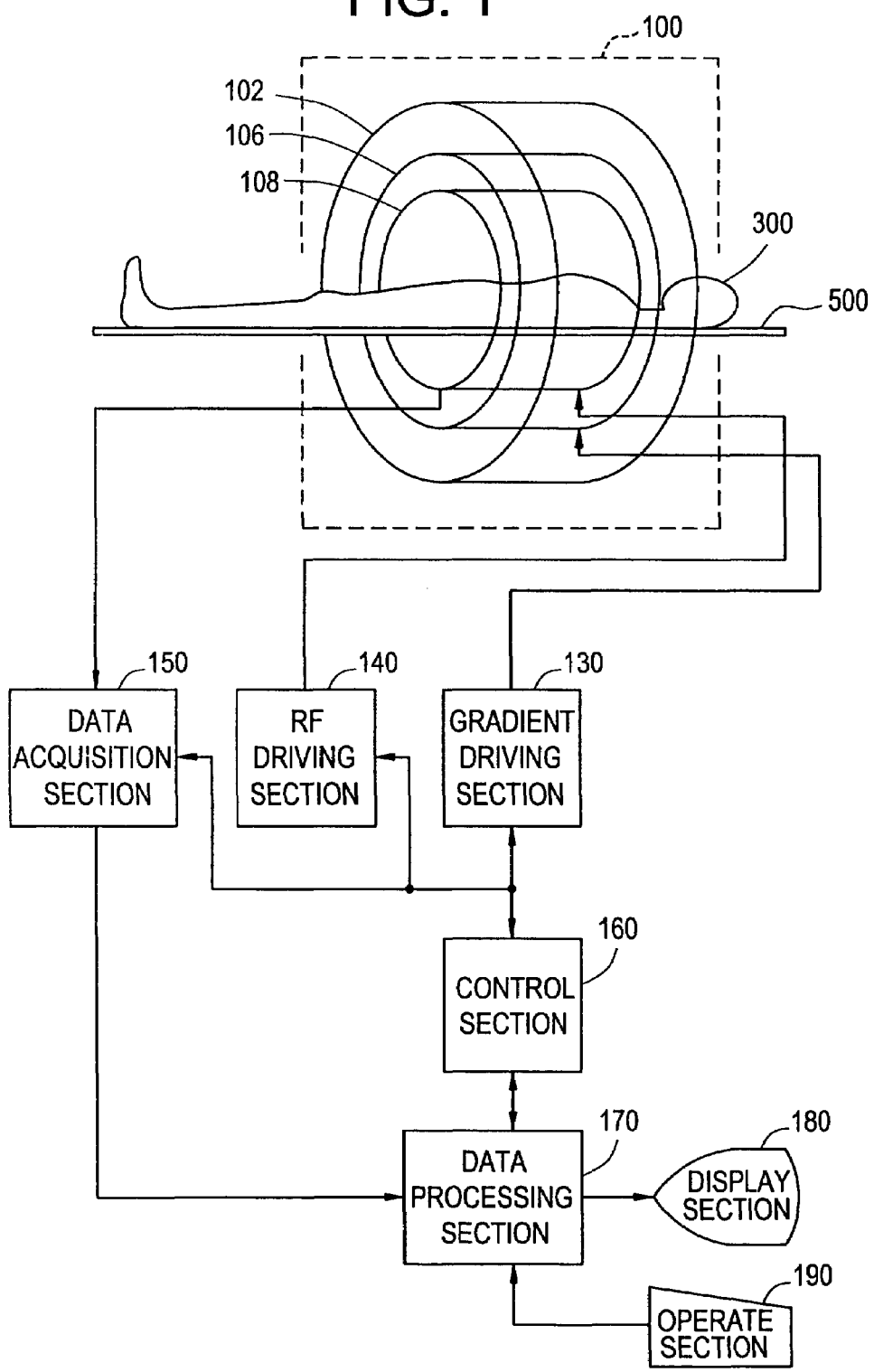
FIG. 1 is a block diagram of an apparatus in accordance with an embodiment of the present invention.

Several embodiments of the present invention will now be described in detail with reference to the accompanying drawings. FIG. 1 shows a block diagram of an imaging apparatus, which is an embodiment of the present invention. The configuration of the apparatus represents an embodiment of the apparatus in accordance with the present invention. The operation of the apparatus represents an embodiment of the method in accordance with the present invention.

As shown in FIG. 1, the present apparatus has a magnet system 100. The magnet system 100 has a main magnetic field coil section 102, a gradient coil section 106 and an RF (radio frequency) coil section 108. These coil sections have a generally cylindrical shape and are concentrically disposed. An object to be imaged 300 is rested on a cradle 500 and carried into and out of the generally cylindrical internal space (bore) of the magnet system 100 by carrier means, which is not shown.

The main magnetic field coil section 102 generates a static magnetic field in the internal space of the magnet system 100. The direction of the static magnetic field is generally in parallel with the direction of the body axis of the object 300. That is, a "horizontal" magnetic field is generated. The main magnetic field coil section 102 is made using a superconductive coil, for example. It will be easily recognized that the main magnetic field coil section 102 is not limited to the superconductive coil, but may be made using a normal conductive coil or the like.

The gradient coil section 106 generates gradient magnetic fields for imparting gradients to the static magnetic field strength. The gradient magnetic fields to be generated are the following three: a slice gradient magnetic field, a readout gradient magnetic field and a phase encoding gradient magnetic field. The gradient coil section 106 has three gradient coils, which are not shown, corresponding to these three gradient magnetic fields.

The RF coil section 108 generates a high frequency magnetic field for exciting spins within the object 300 in the static magnetic field space. The generation of the high frequency magnetic field will be sometimes referred to as transmission of an RF excitation signal hereinafter. The RF coil section 108 also receives electromagnetic wave, i.e., a magnetic resonance signal, generated by the excited spins.

The gradient coil section 108 has transmission and receive coils, which are not shown. For the transmission and receive coils, the same coil or separate dedicated coils may be used.

The gradient coil section 106 is connected with a gradient driving section 130. The gradient driving section 130 supplies driving signals to the gradient coil section 106 to generate the gradient magnetic fields. The gradient driving section 130 has three driving circuits, which are not shown, corresponding to the three gradient coils in the gradient coil section 106.

The RF coil section 108 is connected with an RF driving section 140. The RF driving section 140 supplies a driving signal to the RF coil section 108 to transmit the RF excitation signal, thereby exciting the spins within the object 300.

The RF coil section 108 is connected with a data acquisition section 150. The data acquisition section 150 gathers receive signals received by the RF coil section 108 and acquires the signals as view data.

The gradient driving section 130, RF driving section 140 and data acquisition section 150 are connected with a control section 160. The control section 160 controls the gradient driving section 130 through the data acquisition section 160 to perform imaging.

A portion consisting of the magnet system 100, gradient driving section 130, RF driving section 140, data acquisition section 150 and control section 160 is an embodiment of the signal collecting means of the present invention.

The output of the data acquisition section 150 is connected to a data processing section 170. The data processing section 170 is made using, for example, a computer. The data processing section 170 has a memory, which is not shown. The memory stores programs for the data processing section 170 and several kinds of data. The function of the present apparatus is achieved by the data processing section 170 executing the program stored in the memory.

The data processing section 170 stores data gathered from the data acquisition section 150 in the memory. A data space is formed in the memory. The data space constitutes a two-dimensional Fourier space. The data processing section 170 performs a two-dimensional inverse Fourier transformation on the data in the two-dimensional Fourier space to produce (reconstruct) an image of the object 300. The two-dimensional Fourier space will be sometimes referred to as a k-space hereinafter. The data processing section 170 is an embodiment of the original image producing means of the present invention.

The data processing section 170 also has a function for filtering the reconstructed image. The data processing section 170 is an embodiment of the image processing apparatus of the present invention. The filtering function of the data processing section 170 will be described later in more detail.

The data processing section 170 is connected to the control section 160. The data processing section 170 is above the control section 160 and controls it. The data processing section 170 is connected with a display section 180 and an operating section 190. The display section 180 comprises a graphic display, etc. The operating section 190 comprises a keyboard, etc., provided with a pointing device.

The display section 180 displays the reconstructed image and several kinds of information output from the data processing section 170. The operating section 190 is operated by a human operator and inputs several commands, information and so forth to the data processing section 170. The operator interactively operates the present apparatus via the display section 180 and operating section 190.

Figure 2:
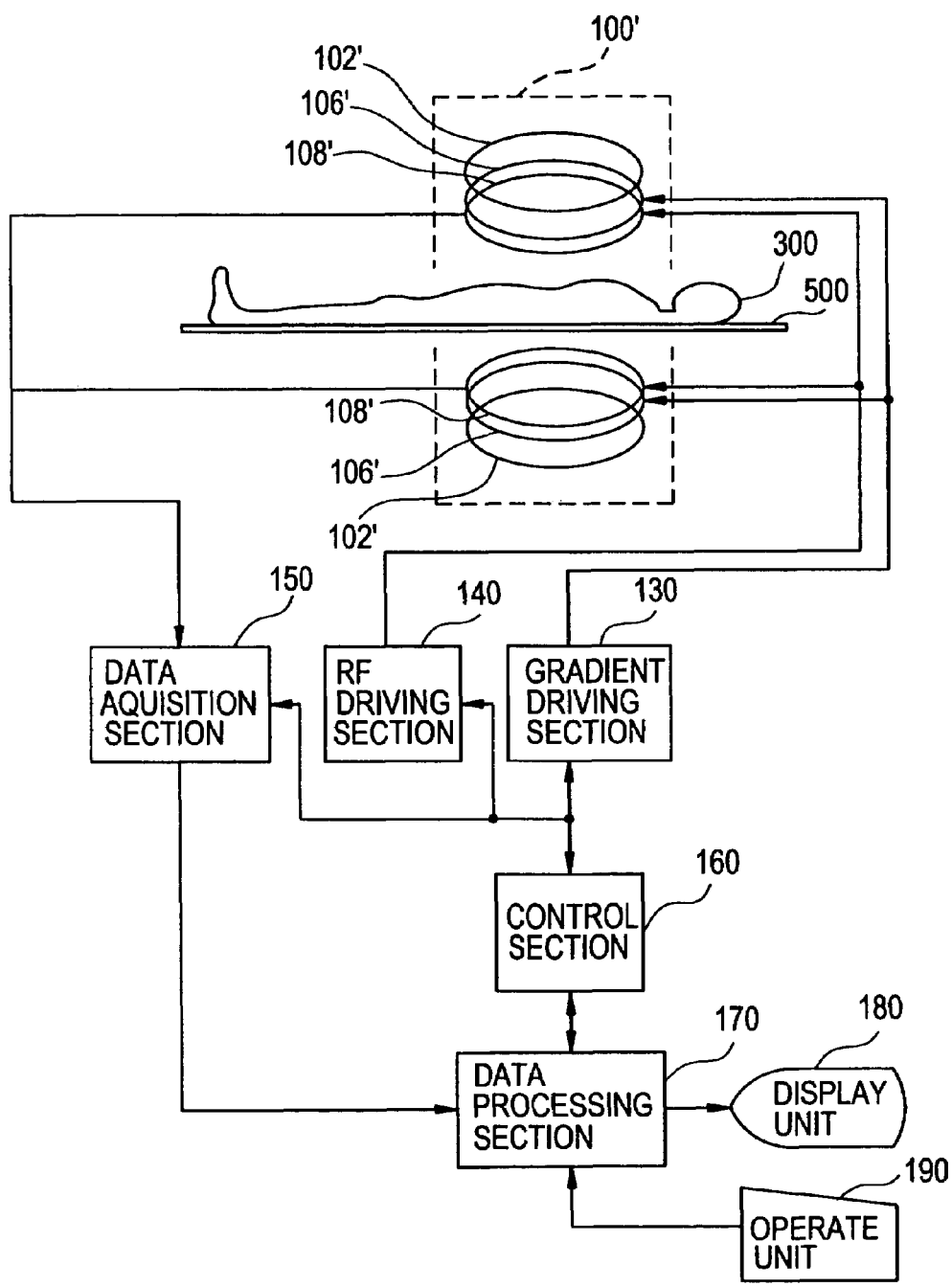
FIG. 2 is a block diagram of an apparatus in accordance with an embodiment of the present invention.

FIG. 2 illustrates a block diagram of an imaging apparatus of another type, which is another embodiment of the present invention. The configuration of the apparatus represents an embodiment of the apparatus in accordance with the present invention. The operation of the apparatus represents an embodiment of the method in accordance with the present invention.

The apparatus shown in FIG. 2 has a magnet system 100' of a type different from that in the apparatus shown in FIG. 1. Since the apparatus has the configuration similar to that of the apparatus shown in FIG. 1 except the magnet system 100', similar portions are designated by similar reference numerals and the explanation thereof will be omitted.

The magnet system 100' has a main magnetic field magnet section 102', a gradient coil section 106' and an RF coil section 108'. The main magnetic field magnet section 102' and the coil sections each comprises a pair of members facing each other across a space. These sections have a generally disk-like shape and are disposed to have a common center axis. The object 300 is rested on a cradle 500 and carried into and out of the internal space (bore) of the magnet system 100' by carrier means, which is not shown.

The main magnetic field magnet section 102' generates a static magnetic field in the internal space of the magnet system 100'. The direction of the static magnetic field is generally orthogonal to the direction of the body axis of the object 300. That is, a "vertical" magnetic field is generated. The main magnetic field magnet section 102' is made using a permanent magnet, for example. It will be easily recognized that the main magnetic field magnet section 102' is not limited to the permanent magnet, but may be made using a super or normal conductive electromagnet or the like.

The gradient coil section 106' generates gradient magnetic fields for imparting gradients to the static magnetic field strength. The gradient magnetic fields to be generated are the following three: a slice gradient magnetic field, a readout gradient magnetic field and a phase encoding gradient magnetic field. The gradient coil section 106' has three gradient coils, which are not shown, corresponding to these three gradient magnetic fields.

The RF coil section 108' transmits an RF excitation signal for exciting spins within the object 300 in the static magnetic field space. The RF coil section 108' also receives a magnetic resonance signal generated by the excited spins. The gradient coil section 108' has transmission and receive coils, which are not shown. For the transmission and receive coils, the same coil or separate dedicated coils may be used.

A portion consisting of the magnet system 100', gradient driving section 130, RF driving section 140, data acquisition section 150 and control section 160 is an embodiment of the signal collecting means of the present invention.

FIG. 3 shows an exemplary pulse sequence for use in magnetic resonance imaging. The pulse sequence is one in accordance with a gradient echo (GRE) technique.

Specifically, (1) is a sequence of an $\alpha°$ pulse for RF excitation of the GRE technique, and (2), (3), (4) and (5) are sequences of a slice gradient Gs, a readout gradient Gr, a phase encoding gradient Gp and a gradient echo MR, respectively, of the GRE technique. It should be noted that the $\alpha°$ pulse is represented by its central signal. The pulse sequence proceeds from the left to the right along a time axis t.

As shown, the $\alpha°$ pulse achieves $\alpha°$ excitation of the spins, wherein the flip angle $\alpha°$ is not greater than 90°. At the same time, the slice gradient Gs is applied to achieve selective excitation for a certain slice.

After the α° excitation, the spins are phase-encoded by the phase encoding gradient Gp. Next, the spins are first dephased and are subsequently rephased by the readout gradient Gr to generate a gradient echo MR. The gradient echo MR has its maximum signal intensity at an echo time TE after the α° excitation. The gradient echo MR is collected by the data acquisition section 150 as view data.

Such a pulse sequence is repeated 64–512 times in a cycle of TR. The phase encoding gradient Gp is varied for each repetition to provide a different phase encoding each time. Thus, view data for 64–512 views filling the k-space are obtained.

Figures 4A, 4B, 4C, 4D, 4E:
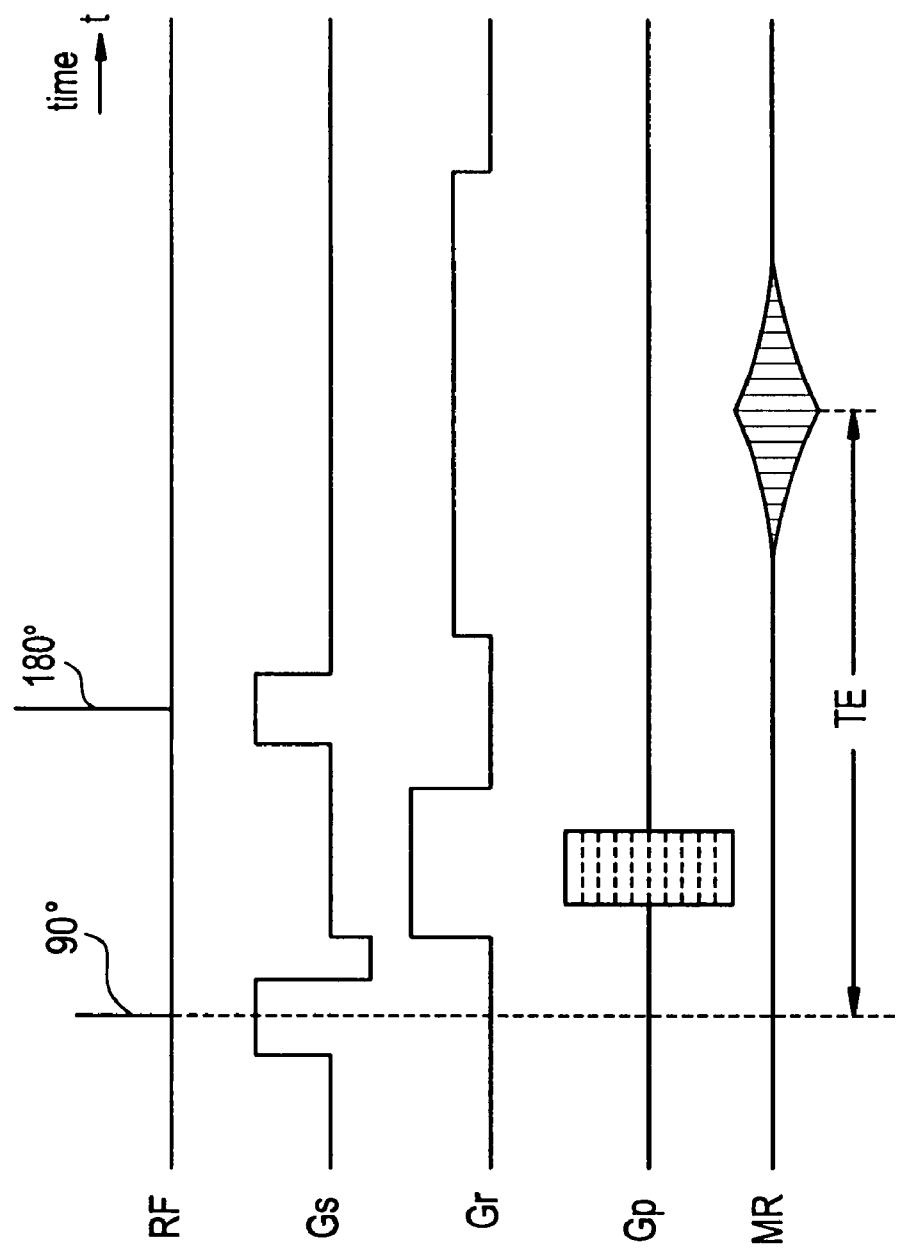
FIGS. 4A–4E are diagrams illustrating an exemplary pulse sequence executed by the apparatus shown in FIG. 1 or 2.

Another example of the magnetic resonance imaging pulse sequence is illustrated in FIG. 4. The pulse sequence is one in accordance with a spin echo (SE) technique.

Specifically, (1) is a sequence of 90° and 180° pulses for RF excitation of the SE technique, and (2), (3), (4) and (5) are sequences of a slice gradient Gs, a readout gradient Gr, a phase encoding gradient Gp and a spin echo MR, respectively, of the SE technique. It should be noted that the 90° and 180° pulses are represented by their respective central signals. The pulse sequence proceeds from the left to the right along a time axis t.

As shown, the 90° pulse achieves 90° excitation of the spins. At the same time, the slice gradient Gs is applied to achieve selective excitation for a certain slice. After a predetermined time from the 90° excitation, 180° excitation by the 180° pulse, or spin inversion, is performed. Again, the slice gradient Gs is applied at the same time to achieve selective inversion for the same slice.

During the period between the 90° excitation and spin inversion, the readout gradient Gr and phase encoding gradient Gp are applied. The readout gradient Gr dephases the spins. The phase encoding gradient Gp phase-encodes the spins.

After the spin inversion, the spins are rephased by the readout gradient Gr to generate a spin echo MR. The spin echo MR has its maximum signal intensity at TE after the 90° excitation. The spin echo MR is collected by the data acquisition section 150 as view data. Such a pulse sequence is repeated 64–512 times in a cycle of TR. The phase encoding gradient Gp is varied for each repetition to provide a different phase encoding each time. Thus, view data for 64–512 views for filling the k-space are obtained.

It should be noted that the pulse sequence employed in the imaging is not limited to that of the SE or GRE technique, but may be that of any other appropriate technique, such as fast spin echo (FSE), fast recovery FSE and echo planar imaging (EPI) techniques.

The data processing section 170 performs a two-dimensional inverse Fourier transformation on the k-space view data to reconstruct a tomographic image of the object 300. The reconstructed image is stored in the memory, and displayed by the display section 180.

In order to remove noise in an image, filtering of the image is performed in the data processing section 170. The filtering may be performed as a part of the image reconstruction, or may be performed by the operator making a selection based on the result of observation of the reconstructed image.

Figure 5:
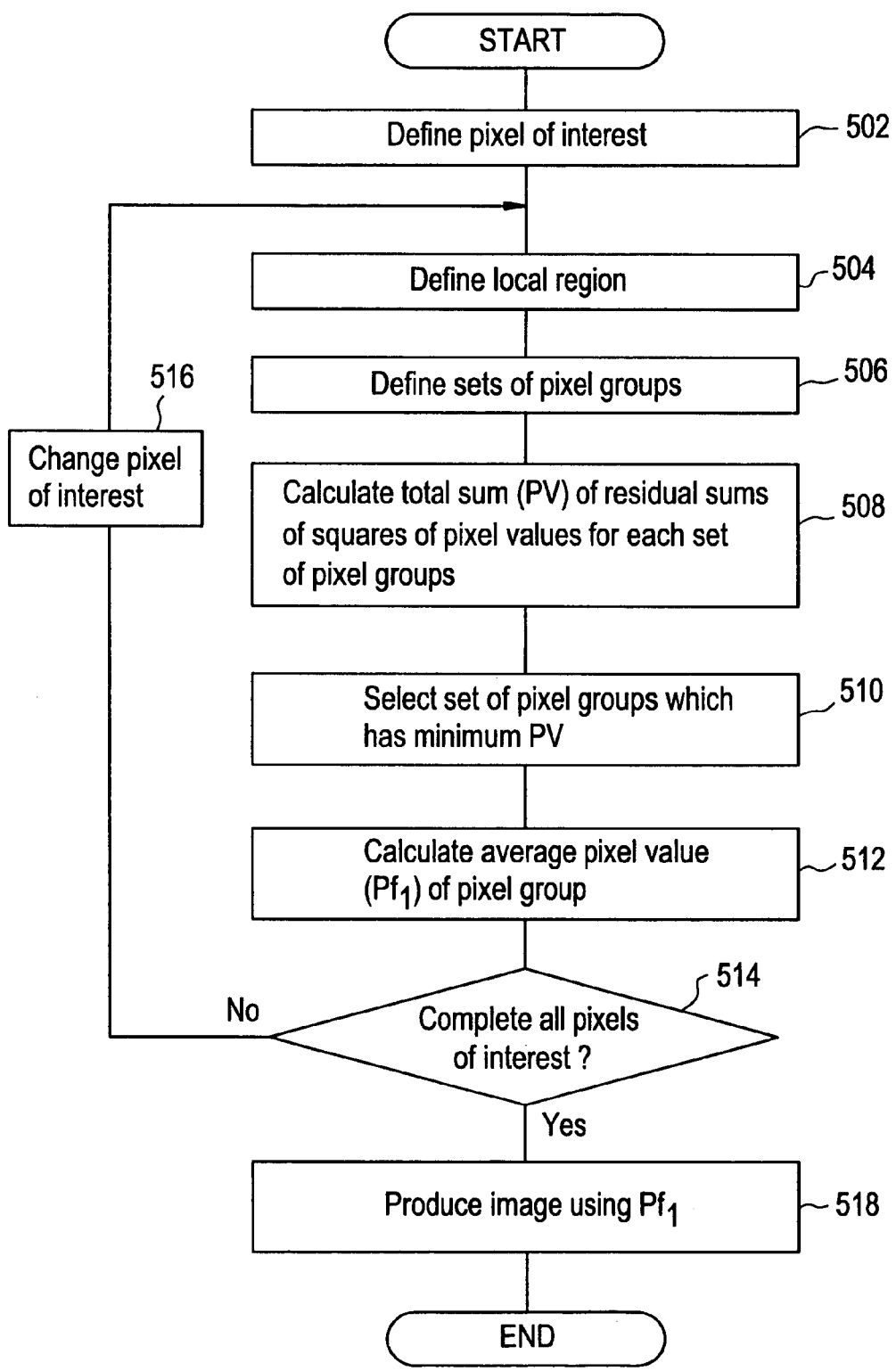
FIG. 5 is a flow chart of image processing performed by the apparatus shown in FIG. 1 or 2.

FIG. 5 shows a flow chart of an image filtering operation by the data processing section 170. As shown, a pixel of interest is defined in an original image at Step 502. The pixel of interest is a pixel of which value is to be determined by the filtering hereafter, and one pixel in the original image is defined as the pixel of interest. For example, a pixel at the center of the original image is defined as the first pixel.

Figure 6:
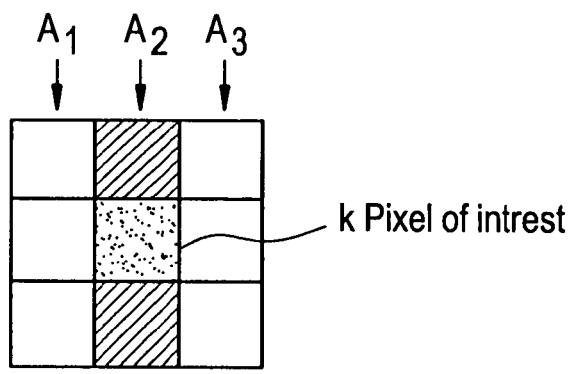
FIG. 6 is a diagram illustrating the concept of a local region.

Next, at Step 504, a local region is defined in the original image. The local region is one containing the pixel of interest, and, for example, a 3×3 pixel matrix centering the pixel of interest k is defined, as shown in FIG. 6. It should be noted that the local region is not limited to the 3×3 pixel matrix, but may be any appropriate region, for example, a 5×5 or 7×7 pixel matrix. The data processing section 170 for performing the process of Step 504 is an embodiment of the region defining means of the present invention.

Next, at Step 506, a set of pixel groups is defined. The set of pixel groups is a collection (set) of pixel groups, and a pixel group is a collection (group) of pixels. The pixel group is comprised of a plurality of pixels in the local region. The pixels do not overlap one another among the groups. The data processing section 170 for performing the process of Step 506 is an embodiment of the pixel group defining means of the present invention.

There are several modes in the group configuration corresponding to the combinations of the pixels. Specifically, in FIG. 6, when three vertical pixel series are designated as A1, A2 and A3, one mode is of a 3-group configuration in which each of the pixel series A1, A2 and A3 constitutes a separate pixel group. Another mode is of a 2-group configuration in which the pixel series A1 constitutes one group and the pixel series A2 and A3 together constitute the other group. Yet another mode is of another 2-group configuration in which the pixel series A1 and A2 together constitute one group and the pixel series A3 constitutes the other group.

Figure 7:
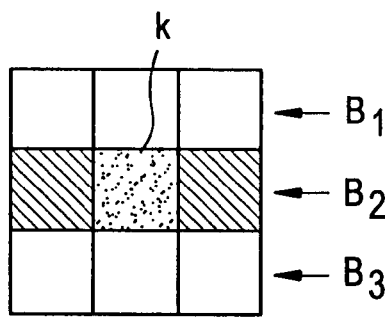
FIG. 7 is a diagram illustrating the concept of a local region.

Alternatively, and as shown in FIG. 7, when three horizontal pixel series are designated as B1, B2 and B3, one mode is of a 3-group configuration in which each of the pixel series B1, B2 and B3 constitutes a separate pixel group; another mode is of a 2-group configuration in which the pixel series B1 constitutes one group and the pixel series B2 and B3 together constitute the other group; and yet another mode is of another 2-group configuration in which the pixel series B1 and B2 together constitute one group and the pixel series B3 constitutes the other group.

Figure 8:
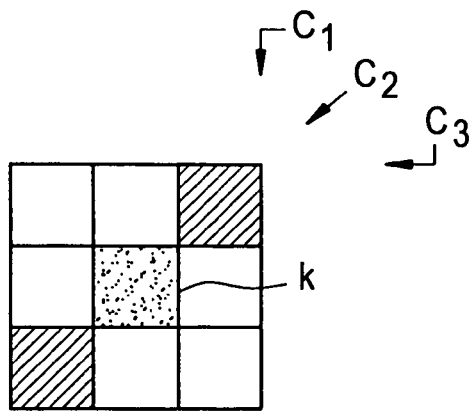
FIG. 8 is a diagram illustrating the concept of a local region.

Moreover, and as shown in FIG. 8, when a pixel series which rises toward the right side in the 45° direction is designated as C2, and two pixel series remaining on the both sides of C2 and having an inverted V shape and a V shape are designated as C1 and C3, respectively, one mode is of a 3-group configuration in which each of the pixel series C1, C2 and C3 constitutes a separate pixel group; another mode is of a 2-group configuration in which the pixel series C1 constitutes one group and the pixel series C2 and C3 together constitute the other group; and yet another mode is of another 2-group configuration in which the pixel series C1 and C2 together constitute one group and the pixel series C3 constitutes the other group.

Figure 9:
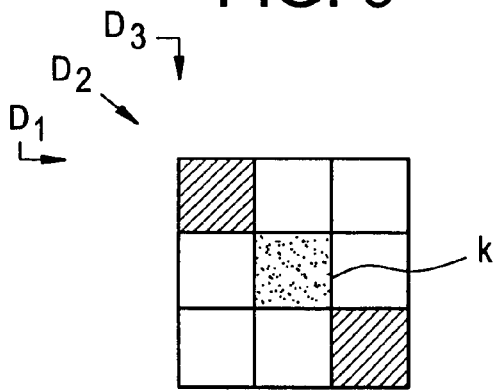
FIG. 9 is a diagram illustrating the concept of a local region.

Furthermore, and as shown in FIG. 9, when a pixel series which rises toward the left side in the 45° direction is designated as D2, and two pixel series remaining on the both sides of D2 and having a V shape and an inverted V shape are designated as D1 and D3, respectively, one mode is of a 3-group configuration in which each of the pixel series D1, D2 and D3 constitutes a separate pixel group; another mode is of a 2-group configuration in which the pixel series D1 constitutes one group and the pixel series D2 and D3 together constitute the other group; and yet another mode is of another 2-group configuration in which the pixel series D1 and D2 together constitute one group and the pixel series D3 constitutes the other group.

At Step 506, these modes of group configuration are defined as respective sets of pixel groups. Thus, a total of twelve sets of pixel groups are defined.

Figure 10:
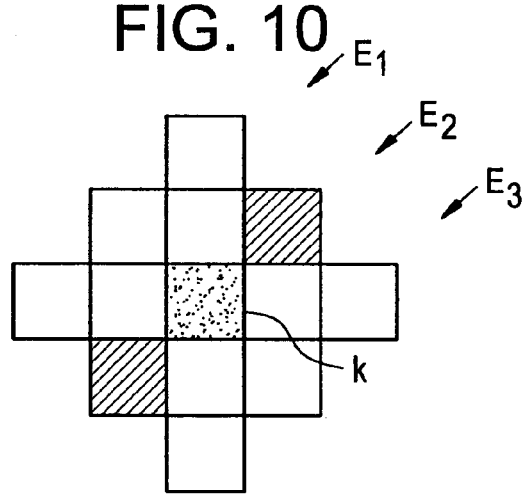
FIG. 10 is a diagram illustrating the concept of a local region.

It should be noted that, in defining the local region at Step 504, a diamond-shaped pixel matrix may be defined as the local region for the pixel series along the 45° directions, as exemplarily shown in FIG. 10. In this case, the local region of the diamond-shaped pixel matrix shown in FIG. 10 is defined in addition to the local region of the square pixel matrix shown in FIG. 6. In other words, the local region is defined in a plurality of modes. While the number of modes is two in this example, more than two modes can exist depending on the size of the local region.

In such a diamond-shaped matrix, when three pixel series which rise toward the right side in the 45° direction are designated as E1, E2 and E3, the sets of pixel groups can be defined as having: a 3-group configuration in which each of the pixel series E1, E2 and E3 constitutes a separate pixel group; a 2-group configuration in which the pixel series E1 constitutes one group and the pixel series E2 and E3 together constitute the other group; and another 2-group configuration in which the pixel series E1 and E2 together constitute one group and the pixel series E3 constitutes the other group.

Figure 11:
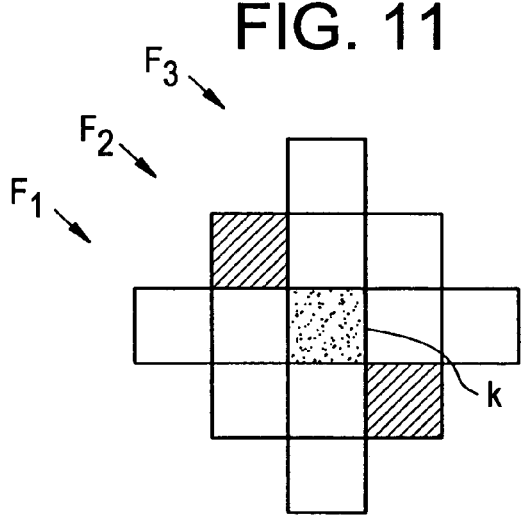
FIG. 11 is a diagram illustrating the concept of a local region.

Moreover, and as shown in FIG. 11, when three pixel series which rise toward the left side in the 45° direction are designated as F1, F2 and F3, the sets of pixel groups can be defined as having: a 3-group configuration in which each of the pixel series F1, F2 and F3 constitutes a separate pixel group; a 2-group configuration in which the pixel series F1 constitutes one group and the pixel series F2 and F3 together constitute the other group; and another 2-group configuration in which the pixel series F1 and F2 together constitute one group and the pixel series F3 constitutes the other group.

Next, at Step 508, a total sum of residual sums of squares of pixel values of the pixel groups are calculated for each set of pixel groups. The total sum of residual sums of squares of pixel values is obtained by calculating respective residual sums of squares of pixel values for the pixel groups, and combining these residual sums of squares within a set of pixel groups.

The total sum of residual sums of squares of pixel values can be calculated using either of the following equations:

$$PV = \sum_{M1}(P_i - \overline{P}_{m1})^2 + \sum_{M2}(P_i - \overline{P}_{m2})^2 + \sum_{M3}(P_i - \overline{P}_{m3})^2, \quad (1)$$

$$PV = \sum_{M1}(P_i - \overline{P}_{m1})^2 + \sum_{M2}(P_i - \overline{P}_{m2})^2, \quad (2)$$

wherein:
Pi is a pixel value, and $\overline{P}_{m1}, \overline{P}_{m2}, \overline{P}_{m3}$ are respective average values of pixel values of the groups M1, M2 and M3.

Eq. (1) is used for a set of pixel groups of the 3-group configuration, and Eq. (2) is used for a set of pixel groups of the 2-group configuration. Since there are twelve sets of pixel groups in this example, twelve PV values are obtained.

Next, at Step 510, a pixel group which has a minimum PV value is selected. Specifically, PV having a minimum value is extracted from the PV values obtained at the previous step, and the set of pixel groups which has the minimum value is identified.

It should be noted that when the local region is defined in a plurality of modes, the PV value which is minimum throughout the local region modes is extracted, and the set of pixel groups which has the minimum value is identified. The data processing section 170 for performing the processes of Steps 508 and 510 is an embodiment of the selecting means of the present invention.

The set of pixel groups thus selected is one which best fits the structure of the original image in the local region. The reason will now be explained.

Figure 12A:
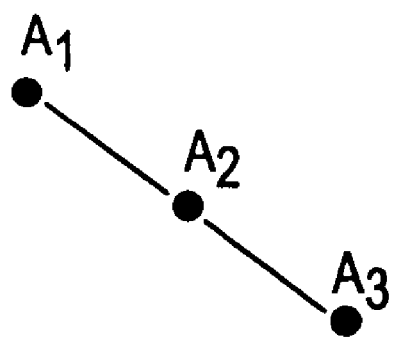
FIGS. 12A–12C are diagrams illustrating the concept of a set of pixel groups.
Figure 12B:
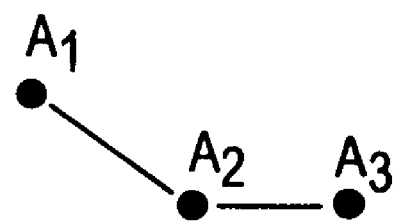

For example, in the pixel matrix shown in FIG. 6, when a contour, or an edge, in the original image is assumed to lie on the pixel series A2, the pixels of the pixel series A2 have values indicating the edge; the pixels of the pixel series A1 have values indicating a structure on the left side of the edge; and the pixels of the pixel series A3 have values indicating a structure on the right side of the edge, as shown in FIG. 12(*a*). It should be noted that the values involve noise in practice.

In FIG. 12, the pixel values in a pixel series are represented by a dot, and the difference between the pixel values is represented as the difference in position in the drawing in the vertical direction, and the difference of the positions of the pixel series is represented by the difference in position in the drawing in the horizontal direction. Moreover, a line connecting the dots represents a profile of a cross section across the edge.

In this case, a set of pixel groups of a configuration in which the pixel series A1, A2 and A3 constitute separate pixel groups fits the structure in the original image, and the set has a smaller PV value than any other sets.

The reason for this is as follows. The PV value in this case is a total of respectively calculated residual sums of squares of pixel values of the pixel series A1, A2 and A3. The pixel values of the pixel series A1 are values representing a portion having an identical structure (i.e., a structure on the left side of the edge) in the original image, involving noise; the pixel values of the pixel series A2 are values representing a portion having another identical structure (i.e., the edge) in the original image, involving noise; and the pixel values of the pixel series A3 are values representing a portion having yet another identical structure (i.e., a structure on the right side of the edge) in the original image, involving noise. Therefore their respective residual sums of squares substantially represent residual sums of squares only of noise, and PV is substantially a total sum of residual sums of squares only of noise.

On the other hand, the configuration of the pixel groups does not fit the structure in the original image in the other sets of pixel groups, and therefore these sets always contain a pixel group formed across portions having different structures. In such a pixel group, the residual sum of squares increases because of the difference in the structure, in addition to noise. Accordingly PV of a set of such pixel groups increases.

When the edge in the original image matches the pixel series A1 in the pixel matrix shown in FIG. 6, the pixels of the pixel series A1 have values indicating the edge, and the pixels of the pixel series A2 and A3 have values indicating a structure on the right side of the edge, as shown in FIG. 12(*b*). It should be noted that these values involve noise in practice.

For such a structure, a set of pixel groups of a 2-group configuration in which the pixel series A1 constitutes a pixel group and the pixel series A2 and A3 together constitute the other pixel group fits the structure in the original image, and the set has a minimum PV value.

Figure 12C:
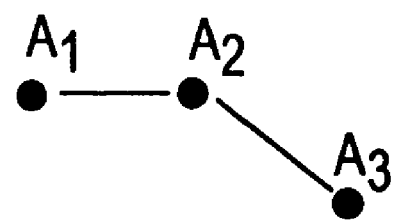

When the edge in the original image matches the pixel series A3 in the pixel matrix shown in FIG. 6, the pixels of the pixel series A3 have values indicating the edge, and the pixels of the pixel series A1 and A2 have values indicating a structure on the left side of the edge, as shown in FIG. 12(c). It should be noted that these values involve noise in practice.

For such a structure, a set of pixel groups of a 2-group configuration in which the pixel series A1 and A2 together constitute a pixel group and the pixel group A3 constitutes the other pixel group fits the structure in the original image, and the set has a minimum PV value.

If the edge lies in a horizontal direction, one of three sets of pixel groups consisting of combinations of the pixel series B1, B2 and B3, shown in FIG. 7, has a minimum PV value.

If the edge lies in the 45° direction rising toward the right side, one of three sets of pixel groups consisting of combinations of the pixel series C1, C2 and C3, shown in FIG. 8, or one of three sets of pixel groups consisting of combinations of the pixel series E1, E2 and E3, shown in FIG. 10, has a minimum PV value.

If the edge lies in the 45° direction rising toward the left side, one of three sets of pixel groups consisting of combinations of the pixel series D1, D2 and D3, shown in FIG. 9, or one of three sets of pixel groups consisting of combinations of the pixel series F1, F2 and F3, shown in FIG. 11, has a minimum PV value.

The minimum value of PV is substantially equal to the residual sums of squares of noise when a set of pixel groups matches a structure in the original image. The residual sums of squares of noise correspond to the variance of noise multiplied by the number of pixels in the set of pixel groups. Hence, it is also possible to extract a value closest to the variance of noise multiplied by the number of pixels in the set of pixel groups, instead of the minimum value, and select a set of pixel groups having that value.

Next, at Step 512, an average value of pixels in a pixel group is calculated. The pixels employed in calculating the average value are those in a pixel group which belongs to the set of pixel groups selected in Step 510, and which contains the pixel of interest k.

When the selected set of pixel groups is, for example, a set of pixel groups of 3-group configuration in which each of the pixel series A1, A2 and A3 constitutes a separate pixel group, the pixel group which contains the pixel of interest k is the pixel series A2, and hence an average pixel value of the pixel series A2 is calculated.

When the selected set of pixel groups is, for example, a set of pixel groups of 2-group configuration in which the pixel series A1 constitutes one pixel group and the pixel series A2 and A3 together constitute the other pixel group, the pixel group which contains the pixel of interest k is the combination of the pixel series A2 and A3, and hence an average pixel value of the pixel series A2 and A3 is calculated.

When the selected set of pixel groups is, for example, a set of pixel groups of 2-group configuration in which the pixel series A1 and A2 together constitute one pixel group and the pixel group A3 constitutes the other pixel group, the pixel group which contains the pixel of interest k is the combination of the pixel series A1 and A2, and hence an average pixel value of the pixel series A1 and A2 is calculated.

When the selected set of pixel groups is a set of pixel groups comprised of the pixel series B1–B3, C1–C3, D1–D3, E1–E3 or F1–F3, an average pixel value of the pixel group which contains the pixel of interest k is calculated as above.

Since the pixel values employed in calculating the average pixel value are those in the pixel group which fits a structure of the original image in the local region, a pixel value can be obtained reflecting the structure of the original image in the local region. Moreover, since the obtained pixel value is an average of a plurality of pixel values, noise is removed. In other words, a pixel value with noise removed can be obtained while enhancing a structure in the original image. The average pixel value thus obtained is used as a new pixel value for the pixel of interest k.

After determining a pixel value of one pixel of interest as above, at Step 514, a decision is made whether the processes are finished for all the pixels of interest, and if not, the pixel of interest is changed at Step 516. The next pixel adjacent to the previous pixel, for example, is thus selected as a new pixel of interest.

The processes of Steps 504–512 are performed on the new pixel of interest, and its pixel value is determined. Thereafter, all the pixels of interest in the original image are processed one by one in a similar manner. After determining the pixel values for all the pixels of interest, an image is produced by the determined pixel values Pf1 at Step 518.

The pixels of interest are all the pixels that constitute the original image. However, the pixels of interest are not limited thereto, but may be those in a predefined region such as, for example, a region of interest (ROI) in the original image, as needed. The data processing section 170 for performing the processes of Steps 512 and 518 is an embodiment of the image producing means of the present invention.

In the image thus produced, noise is reduced, and a structure of the original image in the local region are properly enhanced. In other words, an image of improved quality can be obtained by filtering the original image. The filtered image is stored in the memory, and is displayed on the display section 180.

However, the image which has undergone the filtering as above may show up a structure which does not actually exist, or a false structure, in some combinations of the pixels affected by noise, as a side effect of enhancing a fine structure, although the possibility thereof is lowered as compared to the conventional filtering.

Figure 13:
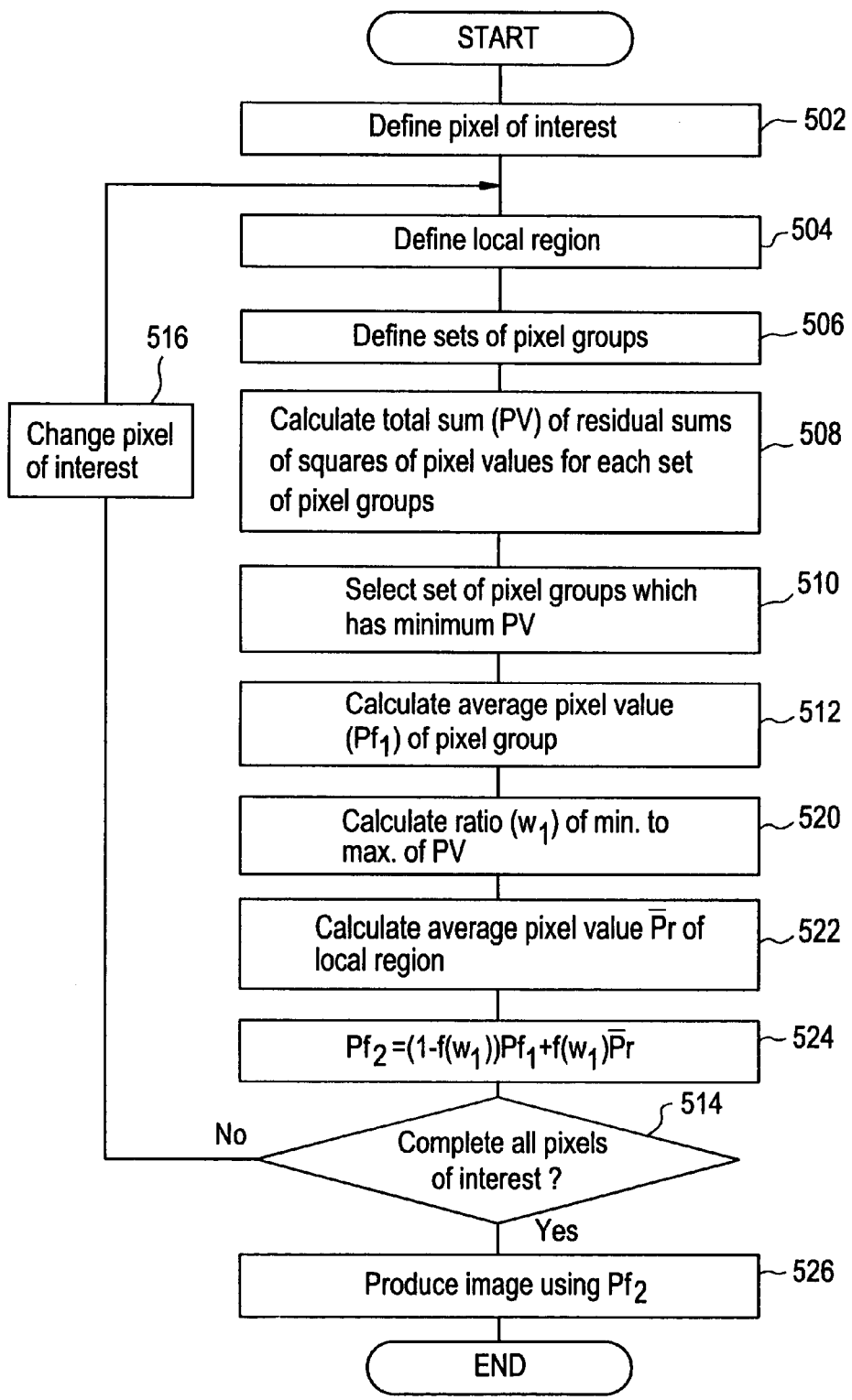
FIG. 13 is a flow chart of image processing performed by the apparatus shown in FIG. 1 or 2.

Therefore, filtering is performed with an additional process for removing such a side effect. FIG. 13 shows a flow chart of the operation of such filtering. In FIG. 13, operations similar to those shown in FIG. 5 are designated by similar reference numerals, and explanation thereof will be omitted. The data processing section 170 for performing the process of Step 512 is an embodiment of the first pixel value calculating means of the present invention.

Next to the process of Step 512, at Step 520, a ratio w1 of the minimum value to the maximum value of PV is calculated. Specifically, $$w_1 = \frac{PV_{\min}}{PV_{\max}}. \tag{3}$$

Then, at Step 522, an average value of pixel values in the local region, $$\overline{P}_r$$

is calculated. The local region for which the average value is calculated is one which contains the set of pixel groups selected at Step 510. Accordingly, when the selected set of pixel groups is contained in the diamond-shaped local region shown in FIG. 10 or 11, for example, an average pixel value of the diamond-shaped local region is calculated. The data processing section 170 for performing the process of Step 522 is an embodiment of the second pixel value calculating means of the present invention.

Figure 14:
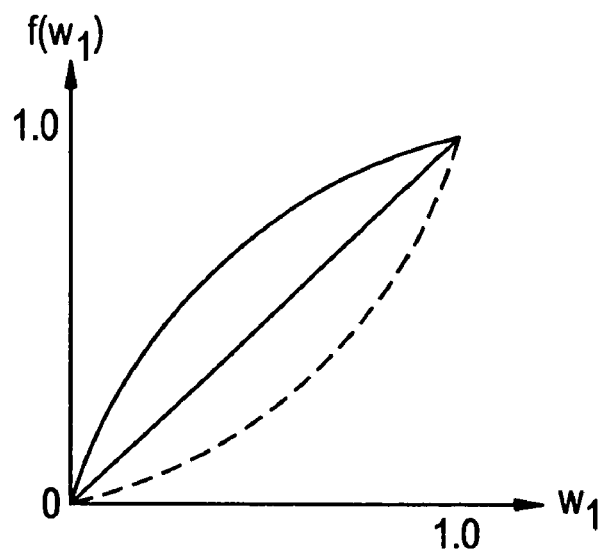
FIG. 14 is a graph illustrating a weighting factor.

Next, in Step 524, a weighted addition is performed on $P_{f1}$, i.e., the average pixel value of a pixel group, and $\overline{P}_r$, i.e., the average value of pixel values of a region, according to the equation below. The average pixel value of a pixel group will be sometimes referred to as a group average pixel value, and the average pixel value of a local region as a region average pixel value, hereinbelow. Moreover, the structure of the original image in the local region will be sometimes referred to simply as a structure in the original image.

$$P_{f2} = (1-f(w_1))P_{f1} + f(w_1)\overline{P}_r, \qquad (4)$$

wherein the weighting factor $f(w_1)$ is a monotonically increasing function of w1 and has a characteristic as exemplarily shown by a solid line in FIG. 14. It should be noted that the characteristic curve is not limited to the characteristic of an upwardly convex shape as shown, but may be of a downwardly convex shape as shown by a dotted line or a straight line as shown by a dot-dash line.

By performing the weighted addition on the group average pixel value and the region average pixel value, the group average pixel value has a varying degree of contribution to a pixel value Pf2 resulting from the addition, the degree of contribution varying with its weight. The weight is a function of w1, i.e., the ratio of the minimum value to the maximum value of PV of pixel values, and as the ratio becomes closer to 1, the weight for the group average pixel value decreases and the weight for the region average pixel value increases.

The ratio of the minimum value to the maximum value of PV of pixel values close to 1 means that the values of PV are similar for all the sets of pixel groups, which in turn means that the region has no prominent structure such as an edge, and it is highly likely that the difference among the pixel values comes from noise.

In this case, the weight for the region average pixel value is increased to enhance its degree of contribution, and the weight for the group average pixel value is decreased to reduce its degree of contribution. Because it is highly likely that the region has no prominent structure, the sharpness of the image probably is not reduced by increasing the degree of contribution of the region average pixel value, but rather, a more important effect can be obtained that the side effect of the croup average pixel value is reduced by decreasing its degree of contribution.

On the other hand, since the ratio of the minimum value to the maximum value of PV of pixel values close to 0 means that it is highly likely that the region has a prominent structure such as an edge, the weight for the group average pixel value is increased to enhance its degree of contribution, and the weight for the region average pixel value is decreased to reduce its degree of contribution.

The above processes are performed on all the pixels of interest one by one, and an image is produced at Step 524 based on the resulting pixel values Pf2. The pixels of interest are all the pixels that constitute the original image. However, the pixels of interest are not limited thereto, but may be those in a predefined region such as, for example, a region of interest in the original image, as needed. The data processing section 170 for performing the processes of Steps 524 and 526 is an embodiment of the image producing means of the present invention.

In the image thus processed, the character of the group average pixel values is effectively exerted while removing its side effect. Therefore, an image of more improved quality can be obtained by filtering the original image. The filtered image is stored in the memory, and is displayed on the display section 180.

The above image processing postulates that a characteristic structure of the original image in the local region is an edge passing through the local region. Thus, if a structure in the original image does not satisfy the postulation, the group average pixel value will not properly reflect the structure in the original image.

Figure 15:
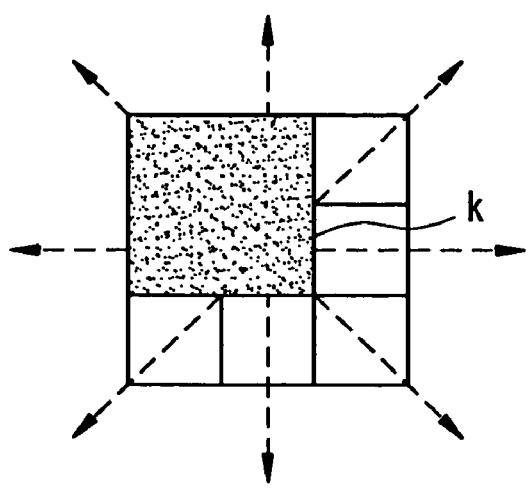
FIG. 15 is a diagram illustrating the concept of a structure of an original image in a local region.

Specifically, if a structure in the original image is, for example, such one as shown in FIG. 15, i.e., no identical structure lies from one end to the other of the local region in any one of the vertical, horizontal and oblique directions, a pixel group which contains the pixel of interest k necessarily contains a pixel in a portion having a different structure. Therefore, the average value in that pixel group is an average value of a plurality of portions having different structures, resulting in reduced sharpness in such portions.

Figure 16A:
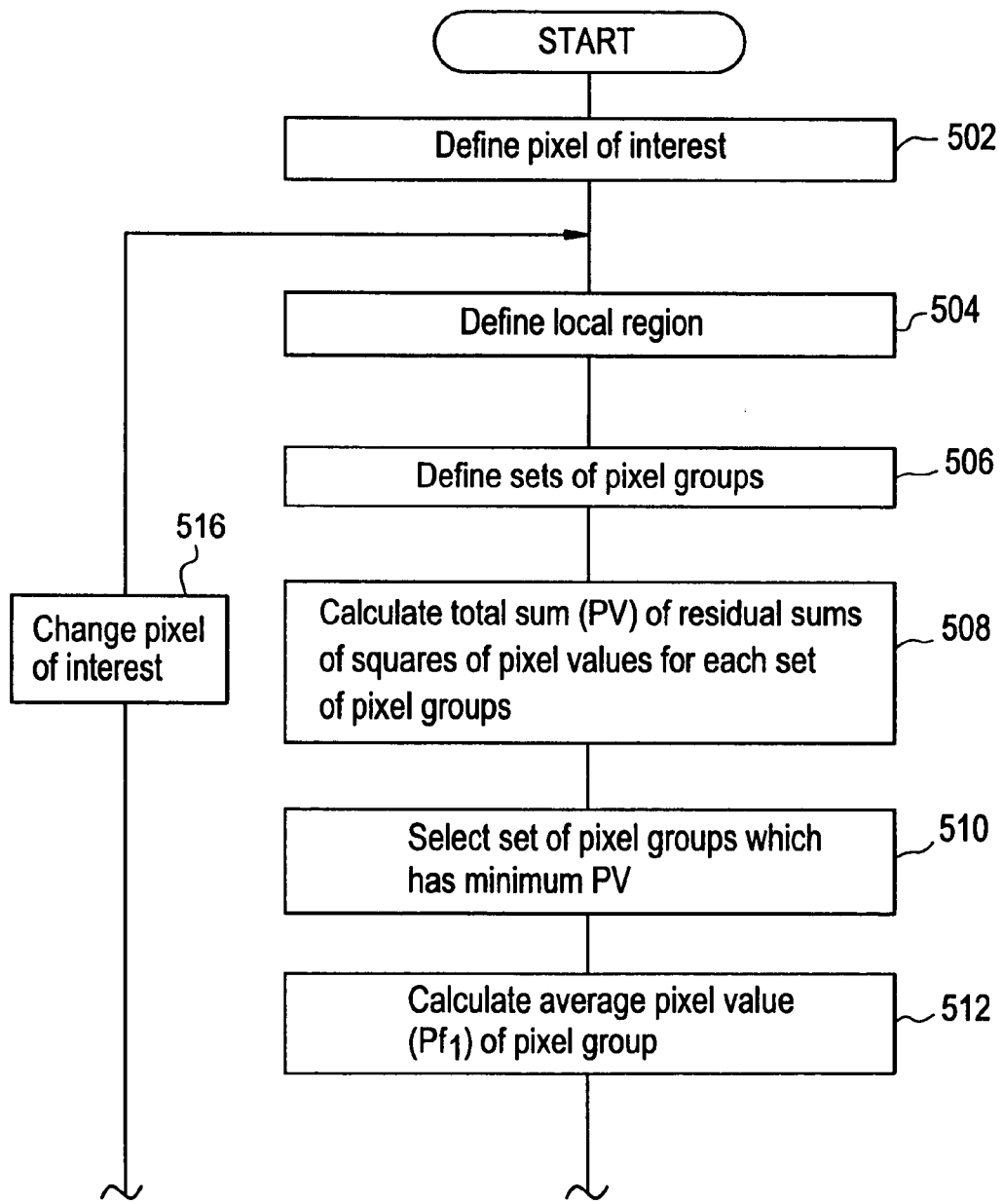
FIG. 16 is a flow chart of image processing performed by the apparatus shown in FIG. 1 or 2.
Figure 16B:
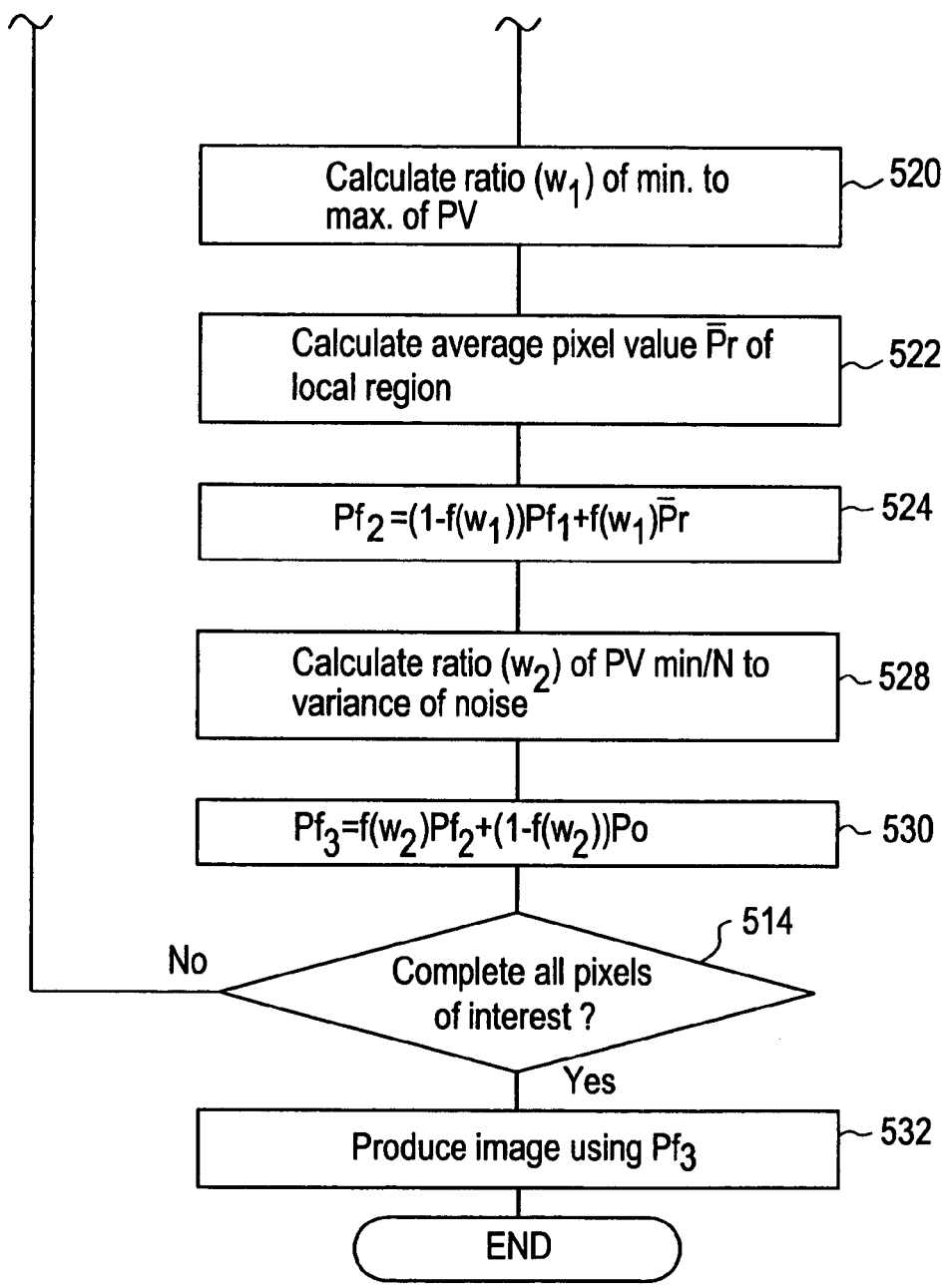

FIG. 16 shows a flow chart of filtering with an additional process for avoiding such phenomenon. In FIG. 16, processes similar to those shown in FIG. 13 are designated by similar reference numerals, and explanation thereof will be omitted. The data processing section 170 for performing the process of Step 524 is an embodiment of the addition means of the present invention.

After the pixel value Pf2 is obtained at Step 524, a ratio w2 of the minimum value of PV divided by N to the variance of noise at Step 528. Specifically, $$w_2 = \frac{PV_{min}/N}{V_{noise}}, \qquad (5)$$

wherein N is a total number of pixels in a set of pixel groups that gives the minimum value of PV. Therefore, the minimum value of PV divided by N represents the variance of pixel values in the set of pixel groups that gives the minimum value of PV. The variance will be referred to as a minimum value of variance of pixel values hereinbelow.

Next, at Step 530, a weighted addition is performed on the pixel value Pf2 and the pixel value Po of the pixel of interest k in the original image according to an equation below. The pixel value of the pixel of interest k in the original image will be referred to simply as a pixel value of the original image.

$$P_{f3} = f(w_2)P_{f2} + (1-f(w_2))P_0, \qquad (6)$$

wherein the weighting factor is a function of w2, and is given, for example, as follows:

$$f(w_2) = 2 \cdot \frac{w_2}{1+w_2^2}. \qquad (7)$$

Figure 17:
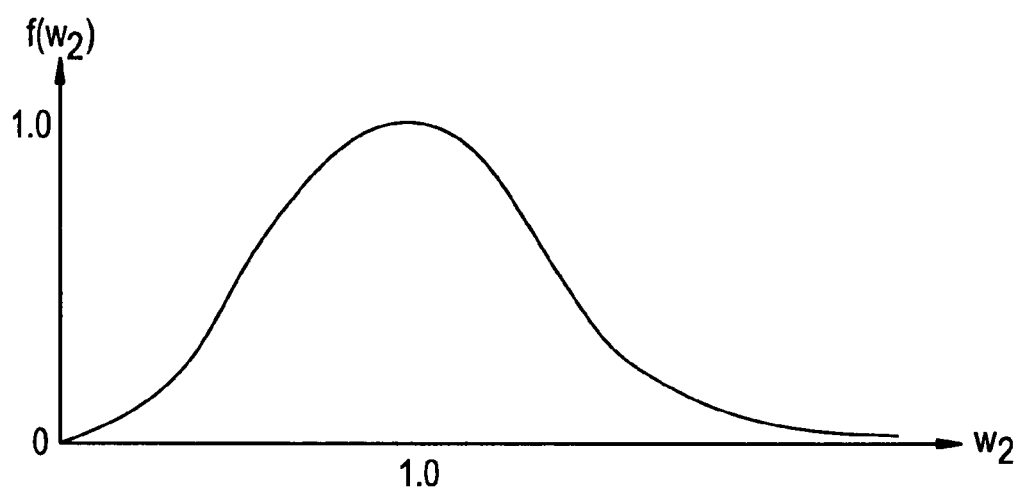
FIG. 17 is a graph illustrating a weighting factor.

This function has a characteristic as shown in FIG. 17.

Specifically, when w2 is 1, the value of the function is 1, and the function value decreases toward 0 as w2 becomes larger in the range of w2 greater than 1. The function value decreases toward 0 as w2 becomes smaller in the range of w2 smaller than 1.

By performing the weighted addition on Pf2 and Po using such a function, the weight for Pf2 is decreased and the weight for Po is increased as the ratio of the minimum value of variance of pixel values to the variance of noise becomes larger than 1.

The ratio of the minimum value of variance of pixel values to the variance of noise close to 1 means that a set of pixel groups having a minimum PV value matches the structure in the original image. In this case, the weight for Pf2 is increased to enhance its degree of contribution.

On the other hand, the ratio of the minimum value of variance of pixel values to the variance of noise greater than 1 means that even the set of pixel groups having a minimum PV value does not match the structure in the original image. In this case, the weight for the pixel value of the original image Po is increased to enhance its degree of contribution and the weight for Pf2 is decreased to reduce its degree of contribution. Thus, a pixel value can be obtained reflecting the structure in the original image.

It is impossible for an ordinary image to have the ratio of the minimum value of variance of pixel values to the variance of noise less than 1, that is, to have the minimum value of variance of pixel values which is less than the variance of noise, and hence, such a ratio probably indicates something abnormal, such as an excessive match to noise. Also in this case, the weight for Pf2 is decreased to reduce its degree of contribution and the weight for the pixel value of the original image Po is increased to enhance its degree of contribution.

The above processes are performed on all the pixels of interest one by one, and an image is produced at Step 532 based on the resulting pixel values Pf3. The pixels of interest are all the pixels that constitute the original image. However, the pixels of interest are not limited thereto, but may be those in a predefined region such as, for example, a region of interest in the original image, as needed. The data processing section 170 for performing the processes of Steps 530 and 532 is an embodiment of the image producing means of the present invention.

The image thus produced can represent special structures in the original image without corrupting them. Thus, an image can be obtained from the original image filtered more properly. The filtered image is stored in the memory, and is displayed on the display section 180.

An image obtained by the above processes is generally an image under the very strong effect of filtering. For convenience of observing the image, the degree of the filtering requires to be properly adjustable.

Figure 18A:
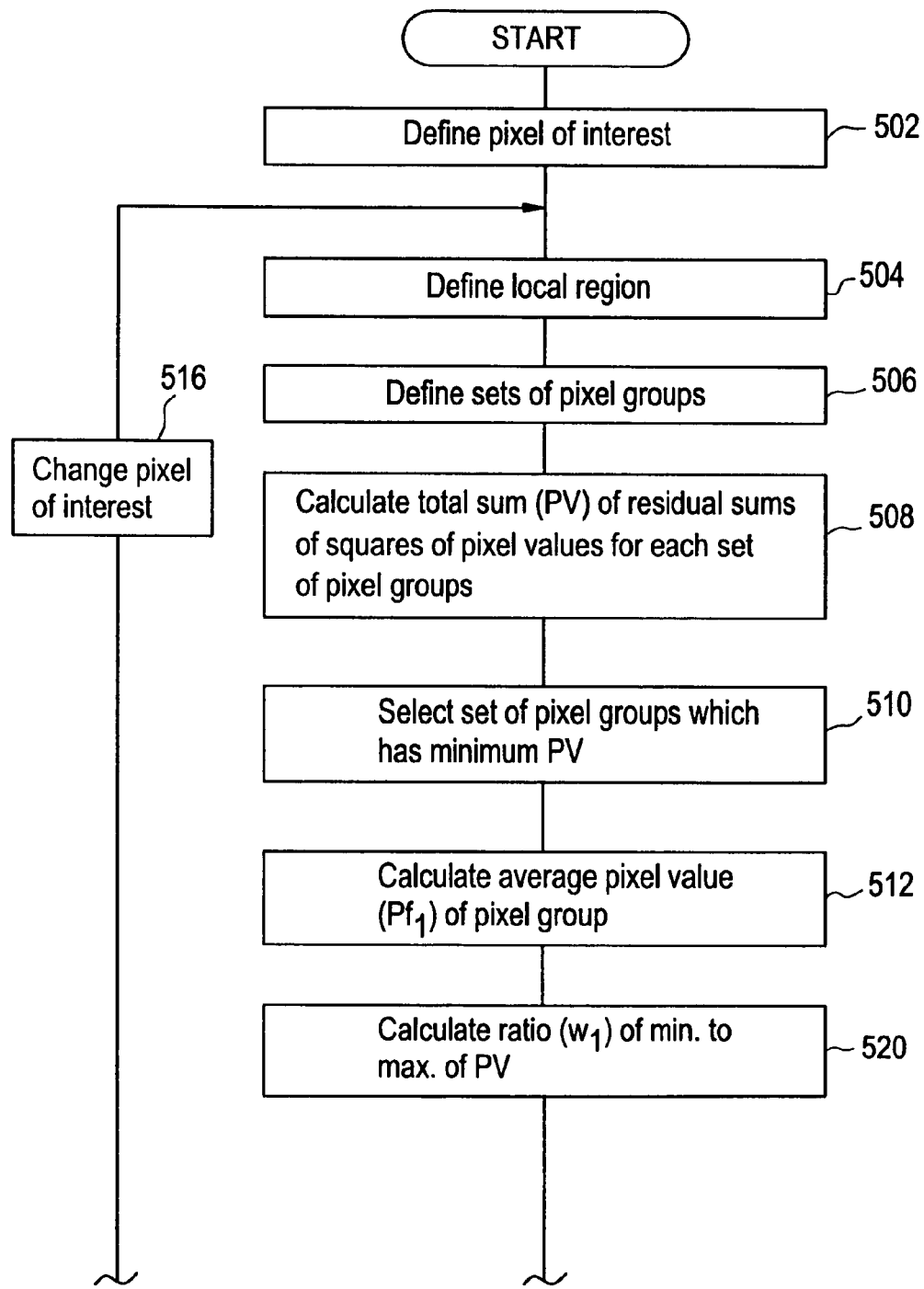
FIG. 18 is a flow chart of image processing performed by the apparatus shown in FIG. 1 or 2.
Figure 18B:
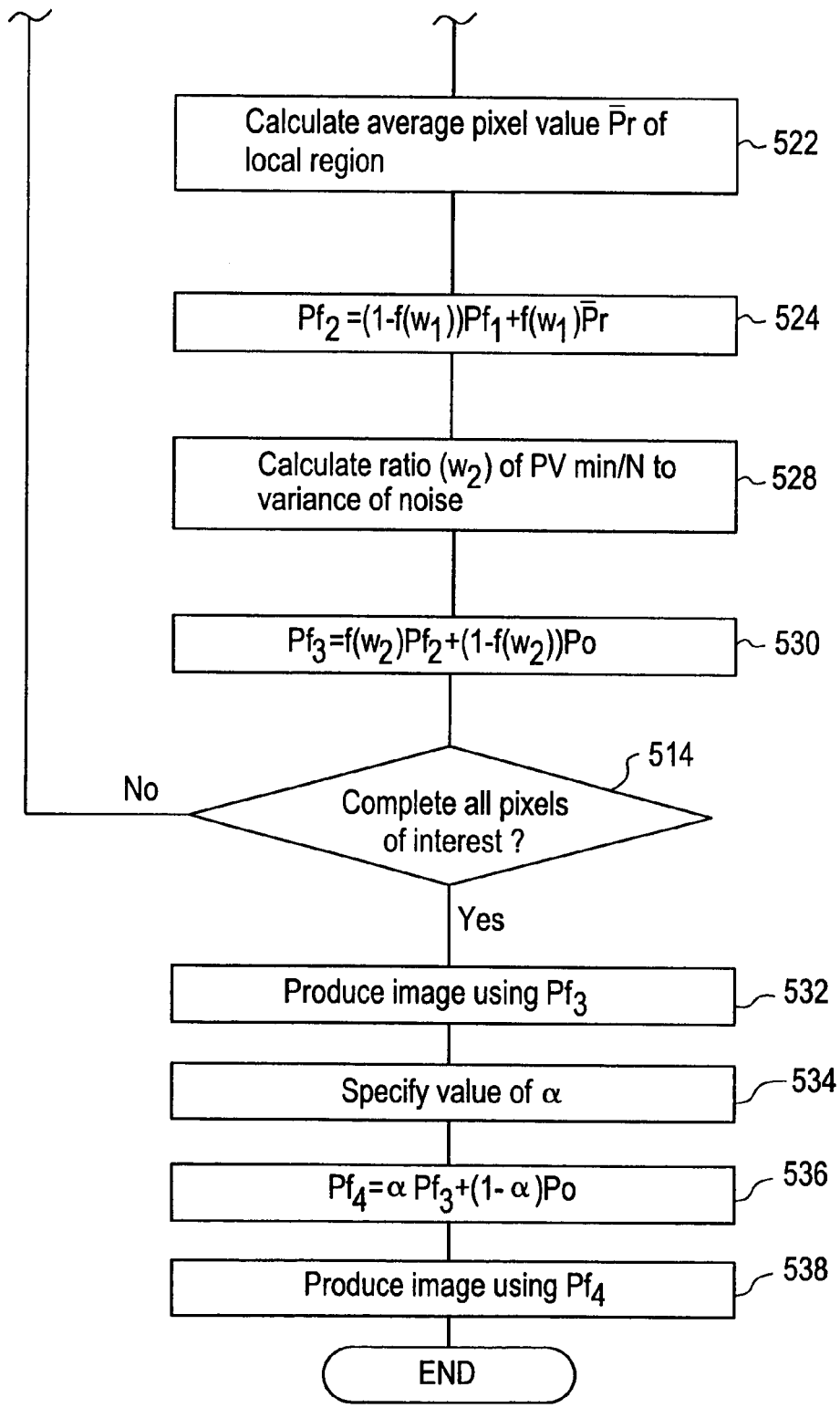

FIG. 18 shows a flowchart of filtering with an additional process to respond such requirement. In FIG. 18, processes similar to those shown in FIG. 16 are designated by similar reference numerals, and explanation thereof will be omitted.

The data processing section 170 for performing the process of Step 524 is an embodiment of the first addition means of the present invention. Moreover, the data processing section 170 for performing the processes of Steps 530 and 532 is an embodiment of the image producing means of the present invention.

Next to Step 532, a weighting factor $\alpha$ is specified by the operator at Step 534. Then, at Step 536, a weighted addition is performed on the pixel value Pf3 and the pixel value Po of the original image for the same pixel, according to the following equation.

$$P_{f4} = \alpha P_{f3} + (1-\alpha) P_0 \quad (8)$$

The data processing section 170 for performing the process of Step 536 is an embodiment of the second addition means of the present invention.

Next, at Step 538, an image is produced using the pixel value Pf4. By performing the weighted addition on Pf3 and Po using the weighting factor $\alpha$, the degree of filtering for the final image can be adjusted according to the value of $\alpha$ as desired. The image is stored in the memory, and is displayed on the display section 180.

A program for a computer to perform the functions as described above is recorded on a recording medium in a computer-readable manner. For the recording medium, for example, a magnetic recording medium, an optical recording medium, a magneto-optical recording medium and any other appropriate type of recording medium may be employed. The recording medium may be a semiconductor storage medium. A storage medium is synonymous with a recording medium in the present specification.

The preceding description is made on an example in which the filtering of an image is performed by the data processing section 170 in a magnetic resonance imaging apparatus; however, it will be easily recognized that the filtering may be performed by a data processing apparatus separate from the magnetic resonance imaging apparatus, such as an EWS (engineering workstation) or PC (personal computer).

Moreover, although the imaging apparatus is described as being a magnetic resonance apparatus in the preceding description, the imaging apparatus is not limited thereto but may be any other type of imaging apparatus, such as an X-ray CT (computed tomography) apparatus, an X-ray imaging apparatus, PET (positron emission tomography) or a γ-camera.

Furthermore, while the present invention is described with reference to an example of processing a medical image, the object to be processed is not limited to the medical image, but the present invention can generally be applied to, for example, noise reduction of a digital image captured by an optical instrument.

Many widely different embodiments of the invention may be configured without departing from the spirit and the scope of the present invention. It should be understood that the present invention is not limited to the specific embodiments described in the specification, except as defined in the appended claims.

The invention claimed is:

1. An image processing method comprising the steps of:
   defining a local region containing a pixel of interest in an original image;
   defining in a plurality of modes a pixel group consisting of a plurality of pixels containing said pixel of interest and a pixel group(s) consisting of a plurality of pixels not overlapping those in the former pixel group, in said region;
   selecting a pixel group mode from said defined plurality of pixel group modes which best fits a structure of said original image in said region;
   calculating an average value of at least said pixel group; and
   producing an image using the calculated pixel value of said pixel group containing the pixel of interest in said selected pixel group mode, as a new pixel value for said pixel of interest.

2. An image processing method comprising the steps of:
   defining a local region containing a pixel of interest in an original image;

defining in a plurality of modes a pixel group consisting of a plurality of pixels containing said pixel of interest and a pixel group(s) consisting of a plurality of pixels not overlapping those in the former pixel group, in said region;

selecting a pixel group mode from said defined plurality of group modes which best fit a structure of said original image in said region;

calculating an average pixel value of said pixel group containing the pixel of interest in said selected pixel group mode;

calculating an average pixel value of said region; and producing ann image using a pixel value obtained from a weighted addition of said average pixel value of the pixel group and said average pixel value of the region, as a new pixel value for said pixel of interest.

3. An image processing method comprising the steps of:
defining a local region containing a pixel of interest in an original image;

defining in a plurality of modes a pixel group consisting of a plurality of pixels containing said pixel of interest and a pixel group(s) consisting of a plurality of pixels not overlapping those in the former pixel groups, in said region;

selecting a pixel group mode from said defined plurality of pixel group modes which best fits a structure of said original image in said region;

calculating an average pixel value of said pixel group containing the pixel of interest in said selected pixel group mode;

calculating an average pixel value of said region;

performing a weighted addition on said average pixel value of the pixel group and said average pixel value of the region; and producing an image using a pixel value obtained from a weighted addition of the pixel value obtained from said former weighted addition and a pixel value of said pixel of interest, as a new pixel value for said pixel of interest.

4. An image processing method comprising the steps of:
defining a local region containing a pixel of interest in an original image;

defining in a plurality of modes a pixel group consisting of a plurality of pixels containing said pixel of interest and a pixel group(s) consisting of a plurality of pixels not overlapping those in the former pixel group,in said region;

selecting a pixel group mode from said defined plurality of pixel group modes which best fits a structure of said original image in said region;

calculating an average pixel value of said pixel group containing the pixel of interest in said selected pixel group mode;

calculating an average pixel value of said region;

performing a weighted addition on said average pixel value of the pixel group and said average pixel value of the region;

producing an image using a pixel value obtained from a weighted addition of the pixel value obtained from said former weighted addition and a pixel value of said pixel of interest, as a new pixel value for said pixel of interest; and performing a weighted addition on said produced image and said original image.

5. The image processing method of claim 4, wherein a weighting factor for said weighted addition of said produced image and said original image is adjustable.

6. The image processing method of any one of claims 2–4, wherein a weighting factor for said weighted addition of said average pixel value of the pixel group and said average pixel value of the region is a function of a minimum value and a maximum value of a total sum of respective residual sums of squares of pixel values of said pixel groups, said total sum being calculated for each of said pixel group modes.

7. The image processing method of claim 6, wherein said function is a function which makes a weight for said average pixel value of the region maximum when the minimum value and the maximum value of said total sum of residual sums of squares are equal, and reduces the weight for said average pixel value of the region as the minimum value of said total sum of residual sums of squares becomes smaller with respect to the maximum value.

8. The image processing method of claim 3 or 4, wherein a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said pixel group modes, and the variance of noise of said original image.

9. The image processing method of claim 8, wherein said function is a function which makes a weight for the pixel value obtained from said former weighted addition maximum when the minimum value of said total sum of residual sums of squares divided by the number of pixels in said pixel group mode is equal to said variance of noise, and reduces the weight for the pixel value obtained from said former weighted addition as the difference between the minimum value of said total sum of residual sums of squares divided by the number of pixels in said pixel group mode and said variance of noise becomes larger.

10. The image processing method of any of claims 2–4, wherein said step of selecting a pixel group mode is performed by selecting a pixel group mode in which said total sum of residual sums of squares of pixel values of the pixel groups is minimum.

11. The image processing method of any of claims 2–4, wherein said step of selecting a pixel group mode is performed by selecting a pixel group mode in which said total sum of residual sums of squares of pixel values of the pixel groups is closes to the variance of noise of said original image multiplied by the number of pixels in the pixel group mode.

12. An image processing method comprising the steps of:
defining in a plurality of modes a local region containing a pixel of interest in an original image;

defining in a plurality of modes a pixel group consisting of a plurality of pixels containing said pixel of interest and a pixel group(s) consisting of a plurality of pixels not overlapping those in the former pixel group, in each of said defined plurality of modes of region;

selecting a pixel group from said defined plurality of pixel group modes which best fits a structure of said original image in said region throughout said plurality of modes of region;

calculating an average value of at least said pixel group; and producing an image using the calculated average pixel value of said pixel group containing the pixel of interest in said selected pixel group mode, as a new pixel value for said pixel of interest.

13. An image processing method comprising the steps of:
defining in a plurality of modes a local region containing a pixel of interest in an original image;

defining in a plurality of modes a pixel group consisting of a plurality of pixels containing said pixel of interest and a pixel group(s) consisting of a plurality of pixels not overlapping those in the former pixel group, in each of said defined plurality of modes of region;

selecting a pixel group mode from said defined plurality of pixel group modes which best fits in a structure of said original image in said region throughout said defined plurality of modes of region;

calculating an average pixel value of said pixel group containing the pixel of interest in said selected pixel group mode;

calculating an average pixel value of said region in one of said plurality of modes of region in which said selected pixel group mode is defined; and producing an image using a pixel value obtained from a weighted addition of said average pixel value of the pixel group and said average pixel value of the region, as a new pixel value for said pixel of interest.

14. An image processing method comprising the steps of:

defining in a plurality of modes a local region containing a pixel of interest in an original image;

defining in a plurality of modes a pixel group consisting of a plurality of pixels containing said pixel of interest and a pixel group(s) consisting of a plurality of pixels not overlapping those in the former pixel group, in each of said defined plurality of modes of region;

selecting a pixel group mode from said defined plurality of pixel group modes which best fits a structure of said original image in said region throughout said defined plurality of modes of region;

calculating an average pixel value of said pixel group containing the pixel of interest in said selected pixel group mode;

calculating an average pixel value of said region in one of said plurality of modes of region in which said selected pixel group mode is defined;.

performing a weighted addition on said average pixel value of the pixel group and said average pixel value of the region; and producing an image using a pixel value obtained from a weighted addition of the pixel value obtained from said former weighted addition and a pixel value of said pixel of interest, as a new pixel value for said pixel of interest.

15. An image processing method comprising the steps of:

defining in a plurality of modes a local region containing a pixel of interest in an original image;

defining in a plurality of modes a pixel group consisting of a plurality of pixels containing said pixel of interest and a pixel group(s) consisting of a plurality of pixels not overlapping those in the former pixel group, in each of said defined plurality of modes of region;

selecting a pixel group mode from said defined plurality of pixel group modes which best fits a structure of said original image in said region throughout said defined plurality of modes of region;

calculating an average pixel value of said pixel group containing the pixel of interest in said selected pixel group mode;

calculating an average pixel value of said region in one of said plurality of modes of region in which said selected pixel group mode is defined;

performing a weighted addition on said average pixel value of the pixel group and said average pixel value of the region;

producing an image using a pixel value obtained from a weighted addition of the pixel value obtained from said former weighted addition and a pixel value of said pixel of interest, as a new pixel value for said pixel of interest; and performing a weighted addition on said produced image and said original image.

16. The image processing method of claim 15, wherein a weighting factor for said weighted addition of said produced image and said original image is adjustable.

17. The image processing method of any one of claims 13–15, wherein a weighting factor for said weighted addition of said average pixel value of the pixel group and said average pixel value of the region is a function of a minimum value and a maximum value of a total sum of respective residual sums of squares of pixel values of said pixel groups, said total sum being calculated for each of said pixel group modes throughout said defined plurality of modes of region.

18. The image processing method of claim 17, wherein said function is a function which makes a weight for said average pixel value of the region maximum when the minimum value and the maximum value of said total sum of residual sums of squares are equal, and reduces the weight for said average pixel value of the region as the minimum value of, said total sum of residual sums of squares becomes smaller with respect to the maximum value.

19. The image processing method of claim 14 or 15, wherein a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said pixel group modes throughout said defined plurality of modes of region, and the variance of noise of said original image.

20. The image processing method of claim 19, wherein said function is a function which makes a weight for the pixel value obtained from said former weighted addition maximum when the minimum value of said total sum of residual sums of squares divided by the number of pixels in said pixel group mode is equal to said variance of noise, and reduces the weight for the pixel value obtained from said former weighted addition as the difference between the minimum value of said total sum of residual sums of squares divided by the number of pixels in said pixel group mode and said variance of noise becomes larger.

21. The image processing method of any one of claims 13–15, wherein said step of selecting a pixel group mode is performed by selecting an image group mode in which said total sum of residual sums of squares of pixel values of the pixel groups is minimum throughout said defined plurality of modes of region.

22. The image processing method of any one of claims 13–15, wherein said step of selecting a pixel group mode is performed by selecting a pixel group mode in which said total sum of residual sums of squares of pixel values of the pixel groups is closest to the variance of noise of said original image multiplied by the number of pixels in the pixel group mode.

23. An image processing apparatus comprising:

a region defining device for defining a local region containing a pixel of interest in an original image;

a pixel group defining device for defining in a plurality of modes a pixel group consisting of a plurality of pixels containing said pixel of interest and a pixel group(s) consisting of a plurality of pixels not overlapping those in the former pixel group, in said region;

a selecting device for selecting a pixel group mode from said defined plurality of pixel group modes which best fits a structure of said original, image in said region;

means for calculating an average value of at least, said pixel group; and an image producing device for producing an image using the calculated average pixel value of said pixel group containing the pixel of interest in said selected pixel group mode, as a new pixel value for said pixel of interest.

24. An image processing apparatus comprising:

a region defining device for defining a local region containing a pixel of interest in an original image;

a pixel group defining device for defining in a plurality of modes a pixel group consisting of a plurality of pixels containing said pixel of interest and a pixel group(s) consisting of a plurality of pixels not overlapping those in the former pixel group, in said region;

a selecting device for selecting a pixel group mode from said defind plurality of pixel group modes which best fits a structure of said original image in said region;

a first pixel value calculating device for calculating an average pixel value of said pixel group containing the pixel of interest in said selected pixel group mode;

a second pixel value calculating device for calculating an average pixel value of said region; and an image producing device for producing an image using a pixel value obtained from a weighted addition of said average pixel value of the pixel group and said average pixel value of the region, as a new pixel value for said pixel of interest.

25. An image processing apparatus comprising:

a region defining device for defining a local region containing a pixel of interest in an original image;

a pixel group defining device for defining in a plurality of modes a pixel group consisting of a plurality of pixels containing said pixel of interest and a pixel group(s) consisting of a plurality of pixels not overlapping those in the former pixel group, in said region;

a selecting device for selecting a pixel group mode from said defined plurality of pixel group modes which best fits a structure of said original image in said region;

a first pixel value calculating device for calculating an average pixel value of said pixel group containing the pixel of interest in said selected pixel group mode;

a second pixel value calculating device for calculating an average pixel value of said region;

an addition device for performing a weighted addition on said average pixel value of the pixel group and said average pixel value of the region; and an image producing device for producing an image using a pixel value obtained from a weighted addition of the pixel value obtained from said former weighted addition and a pixel value of said pixel of interest, as a new pixel value for said pixel of interest.

26. An image processing apparatus comprising:

a region defining device for defining a local region containing a pixel of interest in an original image;

a pixel group defining device for defining in a plurality of modes a pixel group consisting of a plurality of pixels containing said pixel of interest and a pixel group(s) consisting of a plurality of pixels not overlapping those in the former pixel group, in said region;

a selecting device for selecting a pixel group mode from said defined plurality of pixel group modes which best fits a structure of said original image in said region;

a first pixel value calculating device for calculating an average pixel value of said pixel group containing the pixel of interest in said selecting pixel group mode;

a second pixel value calculating device for calculating an average pixel value of said region;

a first addition device for performing a weighted addition on said average pixel value of the pixel group and said average pixel value of the region;

an image producing device for producing an image using a pixel value obtained from a weighted addition of the pixel value obtained from said former weighted addition and a pixel value of said pixel of interest, as a new pixel value for said pixel of interest; and a second addition device for performing a weighted addition on said produced image and said original image.

27. The image processing apparatus of claim 26, wherein a weighting factor for said weighted addition of said produced image and said original image is adjustable.

28. The image processing apparatus of any one of claims 24 26, wherein that a weighting factor for said weighted addition of said average pixel value of the pixel group and said average pixel value of the region is a function of a minimum value and a maximum value of a total sum of respective residual sums of squares of pixel values of said pixel groups, said total sum being calcaulted for each of said pixel group modes.

29. The image processing apparatus of claim 28, wherein said function is a function which makes a weight for said average pixel value of the region maximum when the minimum value and the maximum value of said total sum of residual sums of squares are equal, and reduces the weight for said average pixel value of the region as the minimum value of said total value of said total sum of residual sums of squares becomes smallter with respect to the maximum value.

30. The image processing apparatus of claim 25 or 26, wherein a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said pixel group modes, and the variance of noise of said original image.

31. The image processing apparatus of claim 30, wherein said function is a function which makes a weight for the pixel value obtained from said former weighted addition maximum when the minimum value of said total sum of residual sums of squares divided by the number of pixels in said pixel group mode is equal to said variance of noise,and reduces the weight for the pixel value obtained from said former weighted addition as the difference between the minimum value of said total sum of residual sums of squares divided by the number of pixels in said pixel group mode and said variance of noise becomes larger.

32. The image processing apparatus of any one of claims 24–26, wherein said selecting of a pixel group mode is performed by selecting a pixel group mode in which said total sum of residual sum of squares, of pixel values of the pixel groups is minimum.

33. The image processing apparatus of any one of claims 24–26, wherein said selecting of a pixel group mode is performed by selecting a pixel group mode in which said total sum of residual sums of squares of pixel values of the pixel groups is closest to the variance of noise of said original image multikplied by the number of pixels in the pixel group mode.

34. An image processing apparatus comprising:
a region defining device for defining in a plurality of modes a local region containing a pixel of interest in an original image;
a pixel group defining device for defining in a plurality of modes a pixel group consisting of a plurality of pixels containing said pixel of interest and a pixel group(s) consisting of a plurality of pixels not overlapping those in the former pixel group, in each of said defined plurality of modes of region;
a selecting device for selecting a pixel group mode from said defined plurality of pixel group modes which best fits a structure of said original image in said region throughout said define plurality of modes of region;
means for calculating an average value of at least said pixel group; and
an image producing device for producing an image using the calculated average pixel value of said pixel group containing the pixel of interest in said selected pixel group mode, as a new pixel value for said pixel of interest.

35. An image processing apparatus comprising:
a region defining device for defining in a plurality of modes a local region containing a pixel of interest in an original image;
a pixel group defining device for defining in a plurality of modes a pixel group consisting of a plurality of pixels containing said pixel of interest and a pixel group(s) consisting of a plurality of pixels not overlapping those in the former pixel group, in each of said defined plurality of modes of region;
a selecting device for selecting a pixel group mode from said defined plurality of pixel group modes which best fits a structure of said original image in said region throughout said defined plurality of modes or region;
a first pixel value calculating device for calculating an average pixel value of said pixel group containing the pixel of interest in said pixel group mode;
a second pixel value calculating device for calculating an average pixel value of said region in one of said plurality of modes of region in which said selected pixel group mode is defined; and
an image producing device for producing an image using a pixel value obtained from a weighted addition of said average pixel value of the pixel group and said average pixel value of the region, as a new pixel value for said pixel of interest.

36. An image processing apparatus characterized in that the apparatus comprises:
a region defining device for defining in a plurality of modes a local region containing a pixel of interest in an original image;
a pixel group defining device for defining in a plurality of modes a pixel group consisting of a plurality of pixels containing said pixel of interest and a pixel group(s) consisting of a plurality of pixels not overlapping those in the former pixel group, in each of said defind plurality of modes of region;
a selecting device for selecting a pixel group mode from said defined plurality of pixel group modes which best fits a structure of said original image in said region throughout said defined plurality of modes of region;
a first pixel value calculating device for calculating an average pixel value of said pixel group containing the pixel of interest in said selected pixel group mode;
a second pixel value calculating device for calculating an average pixel value of said region in one of said plurality of modes of region in which said selected pxiel group mode is defined;
an addition device for performing a weighted addition on said average pixel value of the pixel group and said average pixel value of the region; and
an image producing device for producing an image using a pixel value obtained from a weighted addition of the pixel value obtained from said former weighted addition and a pixel value of said pixel of interest, as a new pixel value for said pixel of interest.

37. An image processing apparatus characterized in that the apparatus comprises;
a region defining device for defining in a plurality of modes a local region containing a pixel of interest in an original image;
a pixel group defining device for defining in a plurality of modes a pixel group consisting of a plurality of pixels containing said pixel of interest and a pixel group(s) consisting of a plurality of pixels not overlapping those in the former pixel group, in each of said defined plurality of modes of region;
a selecting device for selecting a pixel group mode from said defined plurality of pixel group modes which best fits a structure of said original image in said region throughout said defined plurality of modes of region;
a first pixel value calculating device for calculating an average pixel value of said pixel group containing the pixel of interest in said selected pixel group mode;
a second pixel value calculating device for calculating an average pixel value of said region in one of said plurality of modes of region in which said selected pixel group is defined;
a first addition device for performing a weighted addition on said average pixel value of the pixel group and said average pixel value of the region;
an image producing device for producing an image using a pixel value obtained from a weighted addition of the pxiel value obtained from said former weighted addition and a pixel value of said pixel of interest, as a new pixel value for said pixel of interest; and
a second addition device for performing a weighted addition on said produced image and said original image.

38. The image processing apparatus of claim 37, wherein a weighting factor for said weighted addition of said produced image and said original image is adjustable.

39. The image processing apparatus of any one of claims 35–37, wherein a weighting factor for said weighted addition of said average pixel value of the pixel group and said average pixel value of the region is a function of a minimum value and a maximum value of a total sum of respective residual sums of squares of pixel values of said pixel groups, said total sum being calculated for each of said pixel group modes throughout said defined plurality of modes of region.

40. The image processing apparatus of claim 39, wherein said function is a function which makes a weight for said average pixel value of the region maximum when the minimum value and the maximum value of said total sum of residual sums of squares are equal, and reduces the weight for said average pixel value of the region as the minimum value of said total sum of residual sums of squares becomes smaller with respect to the maximum value.

41. The image processing apparatus of claim 36 or 37, wherein a weighting factor for said weighted addition of the pixel value obtained from said former weighted addition and a pixel value of said pixel of interest is a function of the minimum value of said total sum of residual sums of squares of pixel values of the pixel groups, said total sum being calculated for each of said pixel group modes throughout said defined plurality of modes of region, and the variance of noise of said original image.

42. The image processing apparatus of claim 41, wherein said function is a function which makes a weight for the pixel value obtained from said former weighted addition maximum when the minimum value of said total sum of residual sums of squares divided by the number of pixels in said pixel group mode is equal to said variance of noise, and reduces the weight for the pixel value obtained from said former weighted addition as the difference between the minimum value of said total sum of residual sums of squares divided by the number of pixels in said pixel group mode and said variance of noise becomes larger.

43. The image processing apparatus of any one of claims 35–37, wherein said selecting of a pixel group mode is performed by selecting an image group mode in which said total sum of residual sums of squares of pixel values of the pixel groups is minimum throughout said defind plurality of modes of region.

44. The image processing apparatus of any one of claims 35–37, wherein said selecting of a pixel group is performed by selecting a pixel group mode in which said total sum of residual squares of pixel values of the pixel groups is closest to the variance of noise of said original image multiplied by the number of pixels in the pixel group mode.

45. A recording medium which records in a computer-readable manner a program for a computer to perform the functions of:
   defining a local region containing a pixel of interest in an original image;
   defining in a plurality of modes a pixel group consisting of a plurality of pixels containing said pixel of interest and a pixel group(s) consisting of a plurality of pixels not overlapping those in the former pixel group, in said region;
   selecting a pixel group mode from said defined plurality of pixel group modes which best fits a structure of said original image in said region;
   calculating an average value of at least said pixel group; and
   producing an image using the calculated average pixel value of said pixel group containing the pixel of interest in said selected pixel group mode, as a new pixel value for said pixel of interest.

46. A recording medium which records in a computer-readable manner a program for a computer to perform the functions of:
   defining in a plurality of modes a pixel group consisting of a plurality of pixels containing said pixel of interest and a pixel group(s) consisting of a plurality of pixels not overlapping those in the former pixel group, in said region;
   selecting a pixel group mode from said defined plurality of pixel group modes which best fits a structure of said original image in said region;
   calculating an average pixel value of said pixel group containing the pixel of interest in said selected pixel group mode;
   calculating an average pixel value of said region; and
   producing an image using a pixel value obtained from a weighted addition of said average pixel value of the pixel group and said average pixel value of the region, as a new pixel value for said pixel of interest.

47. A recording medium which records in a computer-readable manner a program for a computer to perform the functions of:
   defining a local region containing a pixel of interest in an original image;
   defining in a plurality of modes a pixel group consisting of a plurality of pixels containing said pixel of interest and a pixel group(s) consisting of a plurality of pixels not overlapping those in the former pixel group, in said region;
   selecting a pixel group mode from said defined plurality of pixel group modes which best fits a structure of said original image in said region;
   calculating an average pixel value of said pixel group containing the pixel of interest in said selected pixel group mode;
   calculating an average pixel value of said region;
   performing a weighted addition on said average pixel value of the pixel group and said average value of the region; and
   producing an image using a pixel value obtained from a weighted addition of the pixel value obtained from said former weighted addition and a pixel value of said pixel of interest, as a new pixel value for said pixel of interest.

48. A recording medium which records in a computer-readable manner a program for a computer to perform the functions of:
   defining a local region containing a pixel of interest in an original image;
   defining in a plurality of modes a pixel group consisting of a plurality of pixels containing said pixel of interest and a pixel group(s) consisting of a plurality of pixels not overlapping those in the former pixel group, in said region;
   selecting a pixel group mode from said defined plurality of pixel group modes which best fits a structure of said original image in said region;
   calculating an average pixel value of said pixel group containing the pixel of interest in said selected pixel group mode;
   calculating an average pixel value of said region;
   performing a weighted addition on said average pixel value of the pixel group and said average pixel value of the region;
   producing an image using a pixel value obtained from a weighted addition of the pixel value obtained from said former weighted addition and a pixel value of said pixel of interest, as a new pixel value for said pixel of interest; and
   performing a weighted addition on said produced image and said original image.

49. A recording medium which records in a computer-readable manner a program for a computer to perform the functions of:
   defining in a plurality of modes a local region containing a pixel of interest in an original image;
   defining in a plurality of modes a pixel group consisting of a plurality of pixels containing said pixel of interest and a pixel group(s) consisting of a plurality of pixels not overlapping those in the former pixel group, in each of said defined plurality of modes of region;
   selecting a pixel group mode from said defined plurality of pixel group modes which best fits a structure of said original image in said region throughout said defined plurality of modes of region;

calculating an average value of at least said pixel group; and producing an image using the calculated average pixel value of said pixel group containing the pixel of interest in said selected pixel group mode, as a new pixel value for said pixel of interest.

50. A recording medium which records in a computer-readable manner a program for a computer to perform the functions of:

defining in a plurality of modes a local region containing a pixel of interest in an original image;

defining in a plurality of modes a pixel group consisting of a plurality of pixels containing said pixel of interest and a pixel group(s) consisting of a plurality of pixels not overlapping those in the former pixel group, in each of said defined plurality of modes of region;

selecting a pixel group mode from said defined plurality of pixel group modes which best fits a structure of said original image in said region throughout said defined plurality of modes of region;

calculating an average pixel value of said pixel group containin the pixel of interest in said selected pixel group mode;

calculating an average pixel value of said region in one of said plurality of modes of region in which said selected pixel group mode is defined; and producing an image using a pixel value obtained from a weighted addition of said average pixel value of the pixel group and said average pixel value of the region, as a new pixel value for said pixel of interest.

51. A recording medium which records in a computer-readable manner a program for a computer to perform the functions of:

defining in a plurality of modes a local region containing a pixel of interest in an original image;

defining in a plurality of modes a pixel group consisting of a plurality of pixels containing said pixel of interest and a pixel, group(s) consisting of a plurality of pixels not overlapping those in the former pixel group, in each of said defined plurality of modes of region;

selecting a pixel group mode from said defined plurality of pixel group modes which best fits a structure of said original image in said region throughout said defined plurality of modes of region;

calculating an average pixel value of said pixel group containing the pixel of interest in said selected pixel group mode;

calculating an average pixel value of said region in one of said plurality of modes of region in which said selected pixel group mode is defined;

performing a weighted addition on said average pixel value of the pixel group and said average pixel value of the region; and producing an image using a pixel value obtained from a weighted addition of the pixel value obtaind from said former weighted addition and a pixel value of said pixel of interest, as a new pixel value for said pixel of interest.

52. A recording medium which records in a computer-readable manner a program for a computer to perform the functions of:

defining in a plurality of modes a local region containing a pixel of interest in an original image;

defining in a plurality of modes a pixel group consisting of a plurality of pixels contining said pixel of interest and a pixel group(s) consisting of a plurality of pixels not overlapping those in the former pixel group, in each of said defined plurality of modes of region;

selecting a pixel group mode from said defined plurality of pixel group modes which best fits a structure of said original image in said region throughout said defined plurality of modes of region;

calculating an average pixel value of said pixel group containing the pixel of interest in said selected pixel group mode;

calculating an average pixel value of said region in one of said plurality of modes of region in which said selected pixel group is defined;

performing a weighted addition on said average pixel value of the pixel group and said average pixel value of the region;

producing an image using a pixel value obtained froma weighted addition of the pixel value obtained from said former weighted addition and a pixel value of said pixel of interest, as a new pixel value for said pixel of interest; and performing a weighted addition on said produced image and said original image.

53. An imaging apparatus comprising:

a signal collecting device for collecting a signal from an object;

an original image producing device for producing an original image based on said collected signal;

a region defining device for defining a local region containing a pixel of interest in said original image;

a pixel group defining device for defining in a plurality of modes a pixel group consisting of a plurality of pixels containing said pixel of interest and a pixel group(s) consisting of a plurality of pixels not overlapping those in the former pixel group, in said region;

a selecting device for selecting a pixel group mode from said defined plurality of pixel group modes which best fits a structure of said original image in said region;

means for calculating an average value of at least said pixel group; and an image producing device for producing an image using the calculated average pixel value of said pixel group containing the pixel of interest in said selected pixel group mode, as a new pixel value for said pixel of interest.

54. An imaging apparatus comprising:

a signal collecting device for collecting a signal from an object;

an original image producing device for producing an original image based on said collected signal;

a region defining device for defining a local region containing a pixel of interest in said original image;

a pixel group defining device for defining in a plurality of modes a pixel group consisting of a plurality of pixels containing said pixel of interest and a pixel group(s) consisting of a plurality of pixels not overlapping those in the former pixel group, in said region;

a selecting device for selecting a pixel group mode from said defined plurality of pixel group modes which best fits a structure of said original image in said region;

a first pixel value calculating device for calculating an average pixel value of said pixel group containing the pixel of interest in said selected pixel group mode;

a second pixel value calculating device for calculating an average pixel value of said region; and an image producing device for producing an image using a pixel value obtained from a weighted addition of said average pixel value of the pixel group and said average pixel value of the region, as a new pixel value for said pixel of interest.

55. An imaging apparatus comprising:
a signal collecting device for collecting a signal from an object;
an original image producing device for producing an original image based on said collected signal;
a region defining device for defining a local region containing a pixel of interest in said original image;
a pixel group defining device for defining in a plurality of modes a pixel group consisting of a plurality of pixels containing said pixel of interest and a pixel group(s) consisting of a plurality of pixels not overlapping those in the former group, in said region;
a selecting device for selecting a pixel group mode from said defined plurality of pixel group modes which best fits a structure of said original image in said region;
a first pixel value calculating device for calculating an average pixel value of said pixel group containing the pixel of interest in said selected pixel group mode;
a second pixel value calculating device for calculating an average pixel value of said region;
an addition device for performing a weighted addition on said average pixel value of the pixel group and said average pixel value of the region; and
an image producing device for producing an image using a pixel value obtained from a weighted addition of the pixel value obtained from said former weighted addition and a pixel value of said pixel of interest, as a new pixel value for said pixel of interest.

56. An Imaging apparatus comprising:
a signal collecting device for collecting a signal from an object;
an original image producing device for producing an original image based on said collected signal;
a region defining device for defining a local region containing a pixel of interest in said original image;
a pixel group defining device for defining in a plurality of modes a pixel group consisting of a plurality of pixels containing said pixel of interest and a pixel group(s) consisting of a plurality of pixels not overlapping those in the former pixel group, in said region;
a selecting device for selecting a pixel group mode from said defined plurality of pixel group modes which best fits a structure of said original image in said region;
a first first pixel value calculating device for calculating an average pixel value of said pixel group containing the pixel of interest in said selected pixel group mode;
a second pixel value calculating device for calculating an average pixel value of said region;
a first addition device for performing a weighted addition on said average pixel value of the pixel group and said average pixel of the region;
an image producing device for producing an image using a pixel value obtained from a weighted addition of the pixel value obtained from said former weighted addition and a pixel value of said pixel of interest, as a new pixel value for said pixel of interest;and
a second addition device for performing a weighted addition on said produced image and said original image.

57. An imaging apparatus comprising:
a signal collecting device for collecting a signal from an object;
an original image producing device for producing an original image based on said collected signal;
a region defining device for defining in a plurality of modes a local region containing a pixel of interest in an original image;
a pixel group defining device for defining in a plurality of modes a pixel group consisting of a plurality of pixels containing said pixel of interest and a pixel group(s) consisting of a plurality of pixels not overlapping those in the former pixel group, in each defined plurality of modes of region;
a selecting device for selecting a pixel group mode from said defined plurality of pixel group modes which best fits a structure of said original image in said region throughout said defined plurality of modes of region;
means for calculating an average value of at least said pixel group; and
an image producing device for producing an image using the calculated average pixel value of said pixel group containing the pixel of interest in said selected pixel group mode, as a new pixel value for said pixel of interest.

58. An imaging apparatus characterized in that the apparatus comprises:
a signal collecting device for collecting a signal from an object;
an original image producing device for producing an original image based on said collected signal;
a region defining device for defining in a plurality of modes a local region containing a pixel of interest in an original image;
a pixel group defining device for defining in a plurality of modes a pixel group consisting fo a plurality of pixels containing said pixel of interest and a pixel group(s) consisting of a plurality of pixels not overlapping those in the former pixel group, in each of said defined plurality of modes of region;
a selecting device for selecting a pixel group mode from said defined plurality of pixel group modes which best fits a structure of said original image in said region thoughout said defined plurality of modes of region;
a first pixel value calculating device for calculating an average pixel value of said pixel group containing the pixel of interest in said selected pixel group mode;
a second pixel value calculating device for calculating an average pixel value of said region in one of said plurality of modes of region in which said selected pixel group mode is defined; and
an image producing device for producing an image using a pixel value obtained from a weighted addition of said average pixel value of the pixel group and said average pixel value of the region, as a new pixel value for said pixel of interest.

59. An imaging apparatus comprising:
a signal collecting device for collecting a signal from an object;
an original image producing device for producing an original image based on said collected signal;
a region defining device for defining in a plurality of modes a local region containing a pixel of interest in said original image;
a pixel group defining device for defining in a plurality of modes a pixel group consisting of a plurality of pixels containing said pixel of interest and a pixel group(s) consisting of a plurality of pixels not overlapping those in the former pixel group, in each of said defined plurality of modes of region;
a selecting device for selecting a pixel group mode from said defined plurality of pixel group modes which best fits a structure of said original image in said region throughout said defined plurality of modes of region;

a first pixel value calculating device for calculating an average pixel value of said pixel group containing the pixel of interest in said selected pixel group mode;

a second pixel value calculating device for calculating an average pixel value of said region in one of said plurality of modes of region in which said selected pixel group mode is defined;

an addition device for performing weighted addition on said average pixel value of the pixel group and said average pixel value of the region; and an image producing device for producing an imaging using a pixel value obtained from a weighted addition of the pixel value obtained from said former weighted addition and a pixel value of said pixel of interest, as a new pixel value for said pixel of interest.

60. An imaging apparatus characterized in that the apparatus comprises:

a signal collecting device for collecting a signal from an object;

an original image producing device for producing an original image based on said collected signal;

a region defining device for defining in a plurality of modes a local region containing a pixel of interest in said original image;

a pixel group defining device for defining in a plurality of modes a pixel group consisting of a plurality of pixels containing said pixel of interest and a pixel group(s) consisting of a plurality of pixels not overlapping those in the former pixel group, in each of said defined plurality of modes of region;

a selecting device for selecting a pixel group mode from said defined plurality of pixel group modes which best fits a structure of said original image in said region throughout said defined plurality of modes of region;

a first pixel value calculating device for calculating an average pixel value of said pixel group containing the pixel of interest in said selected pixel group mode;

a second pixel value calculating device for calculating an average pixel value of said region in one of said plurality of modes of region in which said selected pixel group mode is defined;

a first addition device for performing a weighted addition on said average pixel value of the pixel group and said average pixel value of the region;

an image producing device for producing an image using a pixel value obtained from a weighted addition of the pixel value obtained from said former weighted addition and a pixel value of said pixel of interest, as a new pixel value for said pixel of interest; and a second addition device for performing a weighted addition on said produced image and said original image.

* * * * *